(12) United States Patent
Nishino

(10) Patent No.: US 12,405,379 B2
(45) Date of Patent: Sep. 2, 2025

(54) TIME MEASUREMENT APPARATUS

(71) Applicant: SONY SEMICONDUCTOR SOLUTIONS CORPORATION, Kanagawa (JP)

(72) Inventor: Tatsuki Nishino, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1025 days.

(21) Appl. No.: 17/056,525

(22) PCT Filed: Apr. 16, 2019

(86) PCT No.: PCT/JP2019/016254
§ 371 (c)(1),
(2) Date: Nov. 18, 2020

(87) PCT Pub. No.: WO2019/225224
PCT Pub. Date: Nov. 28, 2019

(65) Prior Publication Data
US 2021/0208280 A1 Jul. 8, 2021

(30) Foreign Application Priority Data
May 24, 2018 (JP) .................................. 2018-099515

(51) Int. Cl.
*G01S 17/88* (2006.01)
*G01S 7/484* (2006.01)
(Continued)

(52) U.S. Cl.
CPC .............. *G01S 17/88* (2013.01); *G01S 7/484* (2013.01); *G01S 7/4865* (2013.01); *G01S 7/4868* (2013.01); *G01S 17/89* (2013.01)

(58) Field of Classification Search
CPC ........ G01S 17/88; G01S 7/484; G01S 7/4865; G01S 17/89
See application file for complete search history.

(56) References Cited

U.S. PATENT DOCUMENTS 9,564,897 B1    2/2017   Berzins et al.
2011/0249148 A1* 10/2011   Prescher ................ H04N 23/84
                                                           348/E9.053
(Continued)

FOREIGN PATENT DOCUMENTS

CN    101246216 A    8/2008
CN    102334971 A    2/2012
(Continued)

OTHER PUBLICATIONS

Extended European Search Report of EP Application No. 19806385.1, issued on Jul. 9, 2021, 08 pages.
(Continued)

*Primary Examiner* — Isam A Alsomiri
*Assistant Examiner* — Joseph C Fritchman
(74) *Attorney, Agent, or Firm* — CHIP LAW GROUP

(57) ABSTRACT

Provided is a time measurement apparatus which includes a pixel (PZ) that includes a light receiving element and generates a pulse signal (a pixel signal SIG) including a logic pulse on the basis of a light reception result in the light receiving element, a timing detector (a counter section) to detect a light reception timing in the light receiving element on the basis of the pulse signal, a pulse number detector (a time measurement section) to detect a pulse number of the logic pulse included in the pulse signal; and a controller to control, on the basis of the pulse number, an operation of a light source outputting a plurality of light pulses.

12 Claims, 27 Drawing Sheets

(51) Int. Cl.
    *G01S 7/486* (2020.01)
    *G01S 7/4865* (2020.01)
    *G01S 17/89* (2020.01)

(56) References Cited

U.S. PATENT DOCUMENTS

| | | | |
|---|---|---|---|
| 2012/0075615 | A1* | 3/2012 | Niclass .................. G01S 7/489 |
| | | | 356/5.01 |
| 2016/0259057 | A1 | 9/2016 | Ito |
| 2017/0097417 | A1 | 4/2017 | Wang |
| 2017/0356981 | A1* | 12/2017 | Yang ...................... G01S 7/484 |
| 2018/0081061 | A1* | 3/2018 | Mandai ................ G01B 11/026 |
| 2018/0113216 | A1* | 4/2018 | Kremer .................. G01S 17/42 |
| 2019/0033452 | A1 | 1/2019 | Ito |
| 2019/0129015 | A1* | 5/2019 | Ikuta ..................... G01S 7/4865 |
| 2021/0100416 | A1* | 4/2021 | Choi ...................... A47L 9/106 |

FOREIGN PATENT DOCUMENTS

| | | |
|---|---|---|
| CN | 102542999 A | 7/2012 |
| CN | 105319559 A | 2/2016 |
| CN | 105723239 A | 6/2016 |
| CN | 106560999 A | 4/2017 |
| CN | 106662641 A | 5/2017 |
| CN | 107807364 A | 3/2018 |
| CN | 108919294 A | 11/2018 |
| CN | 210166496 U | 3/2020 |
| DE | 102010015941 A1 | 9/2011 |
| EP | 2446301 A1 | 5/2012 |
| JP | 2010-091377 A | 4/2010 |
| JP | 2012513694 A | 6/2012 |
| JP | 2012530917 A | 12/2012 |
| JP | 5681176 B2 | 3/2015 |
| JP | 2016-151458 A | 8/2016 |
| JP | 2017-083243 A | 5/2017 |
| JP | 2018-077071 A | 5/2018 |
| JP | 2018-099515 A | 6/2018 |
| JP | 2018-185342 A | 11/2018 |
| KR | 10-2017-0043995 A | 4/2017 |
| KR | 10-2017-0054221 A | 5/2017 |
| TW | 201714409 A | 4/2017 |
| TW | 201735565 A | 10/2017 |
| WO | 2010/149593 A1 | 12/2010 |
| WO | 2015/075926 A1 | 5/2015 |
| WO | WO-2017141957 A1 | 8/2017 |
| WO | 2017/208673 A1 | 12/2017 |

OTHER PUBLICATIONS

International Search Report and Written Opinion of PCT Application No. PCT/JP2019/016254, issued on Jul. 16, 2019, 10 pages of ISRWO.

Office Action for CN Patent Application No. 201910349785.6, issued on Oct. 22, 2024, 11 pages of English Translation and 10 pages of Office Action.

\* cited by examiner

[FIG. 1]
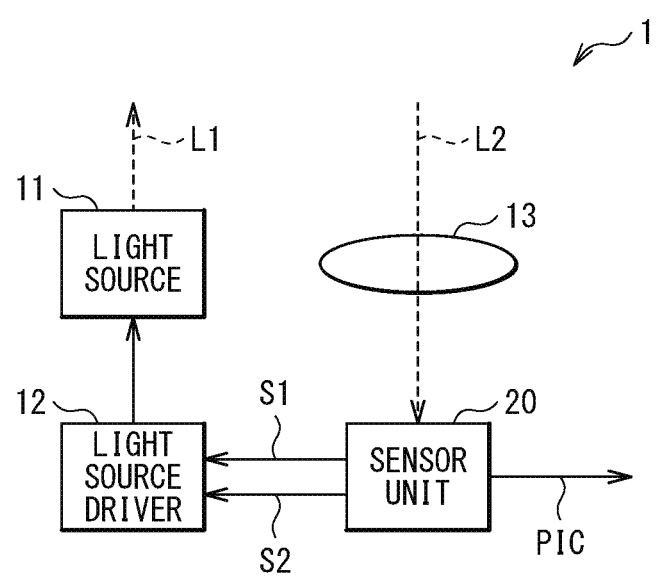

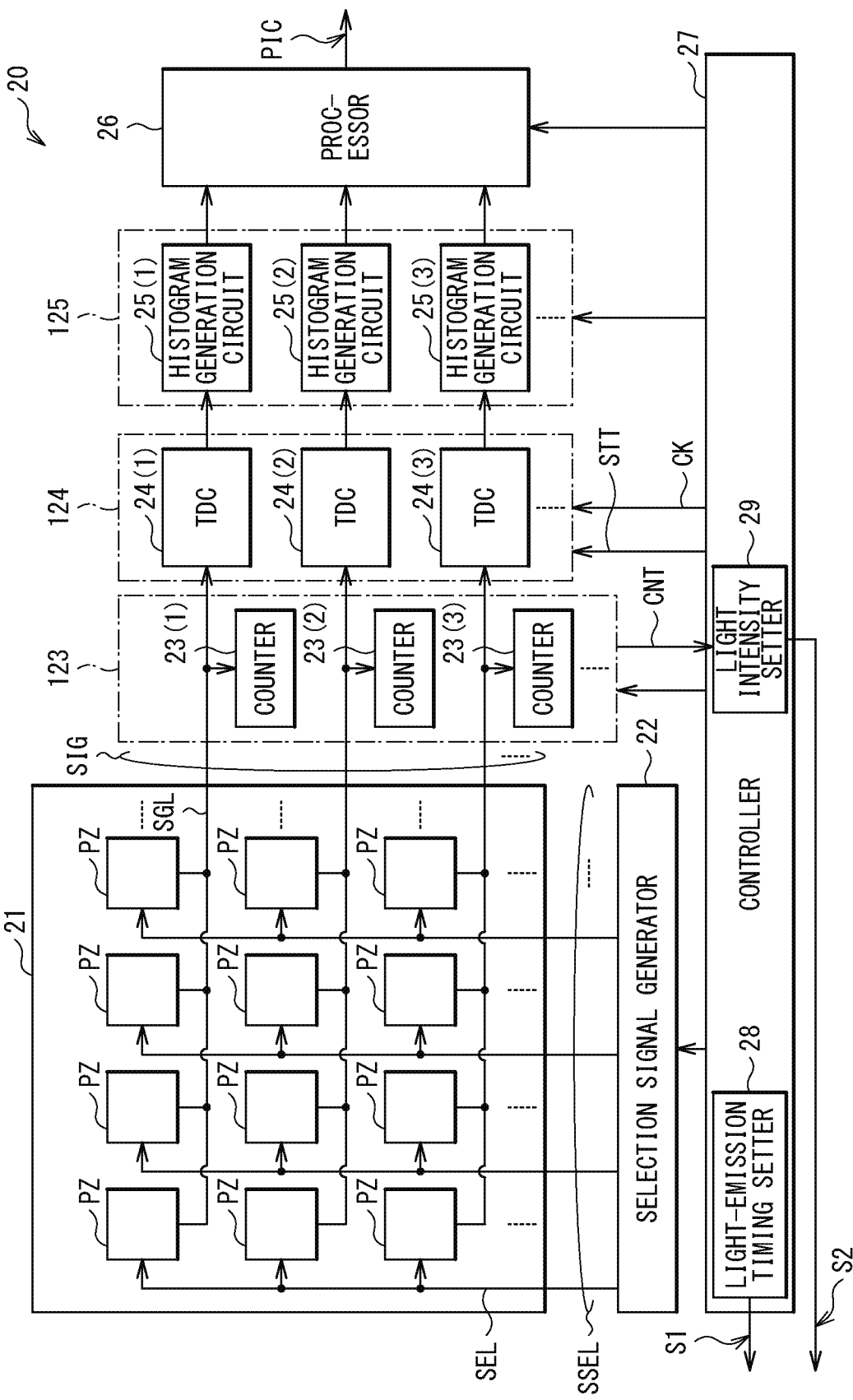
[FIG. 2]

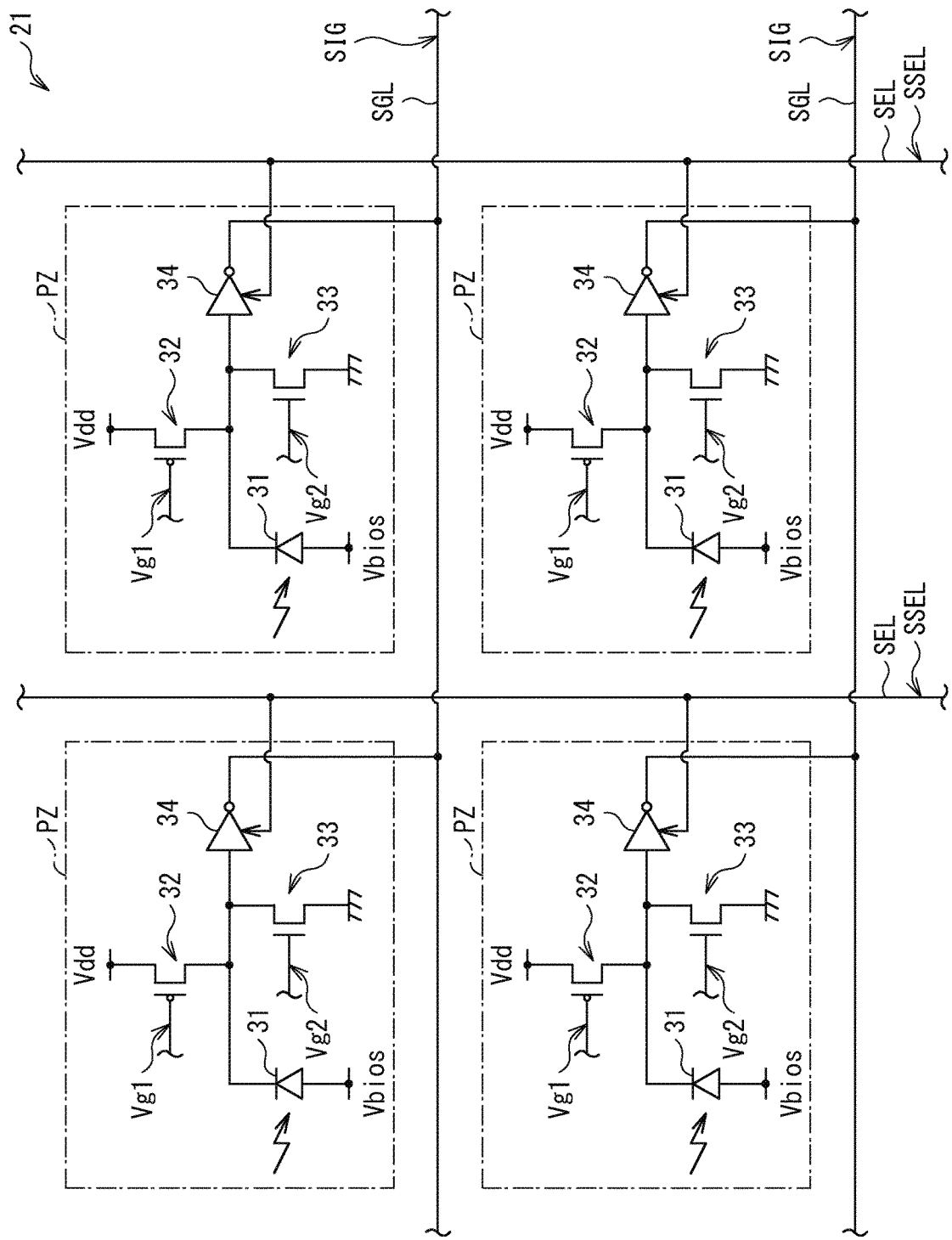
[FIG. 3]

[FIG. 4]
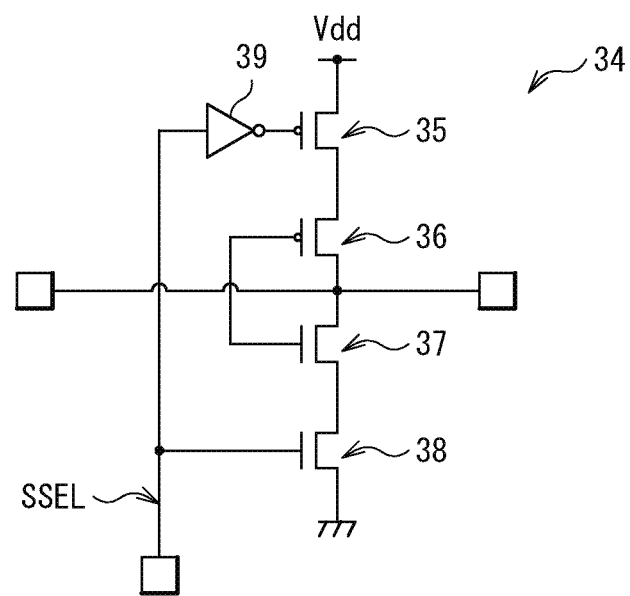
[FIG. 5]
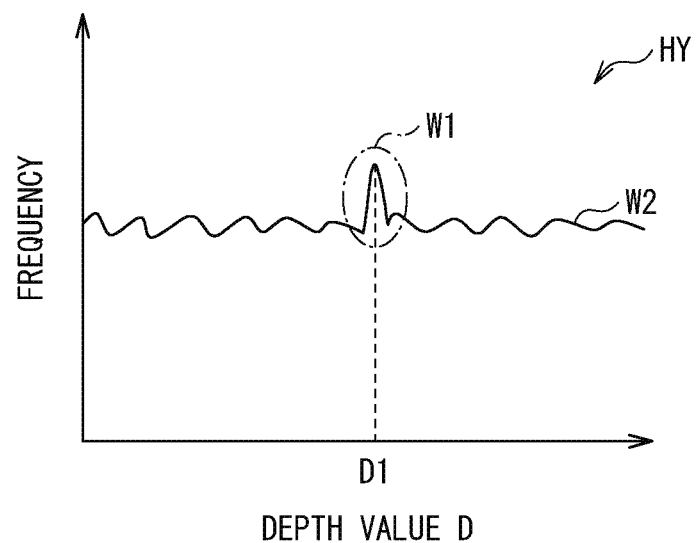

[FIG. 6A]
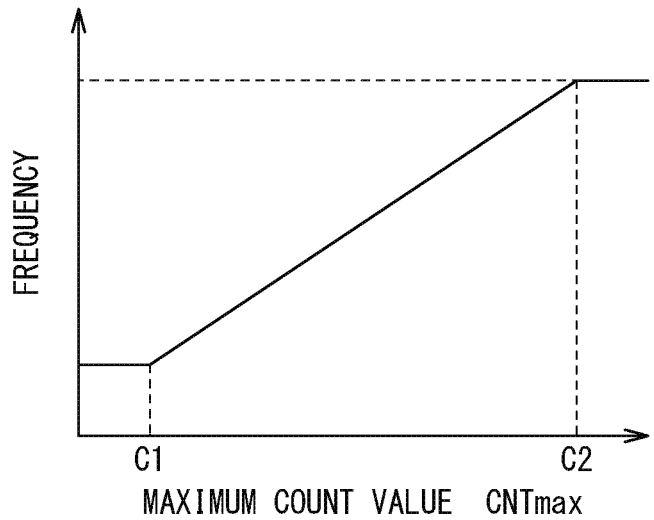
[FIG. 6B]
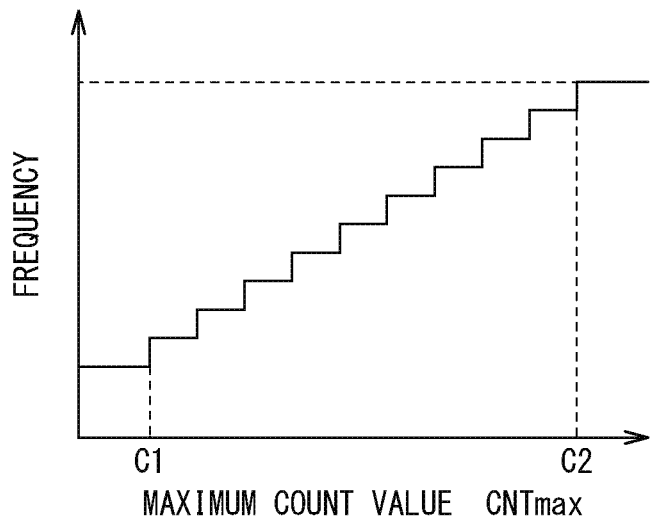
[FIG. 6C]
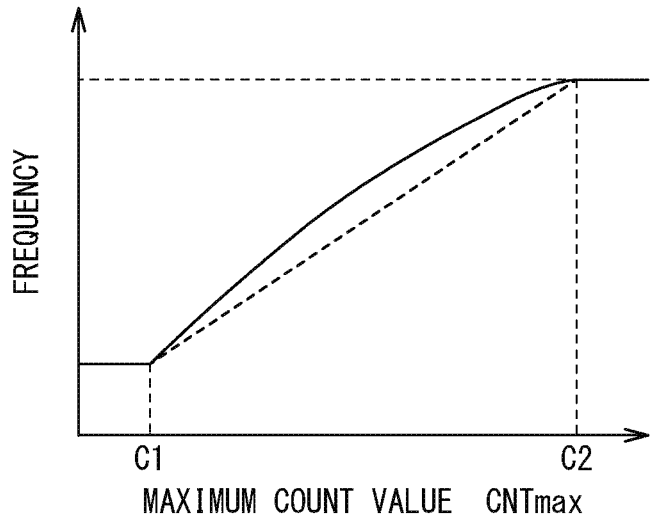

[FIG. 7]
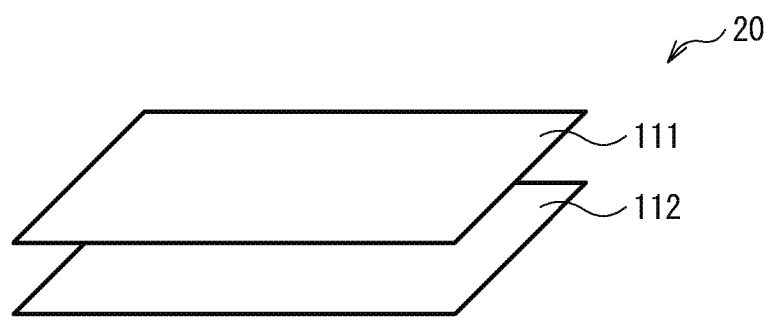

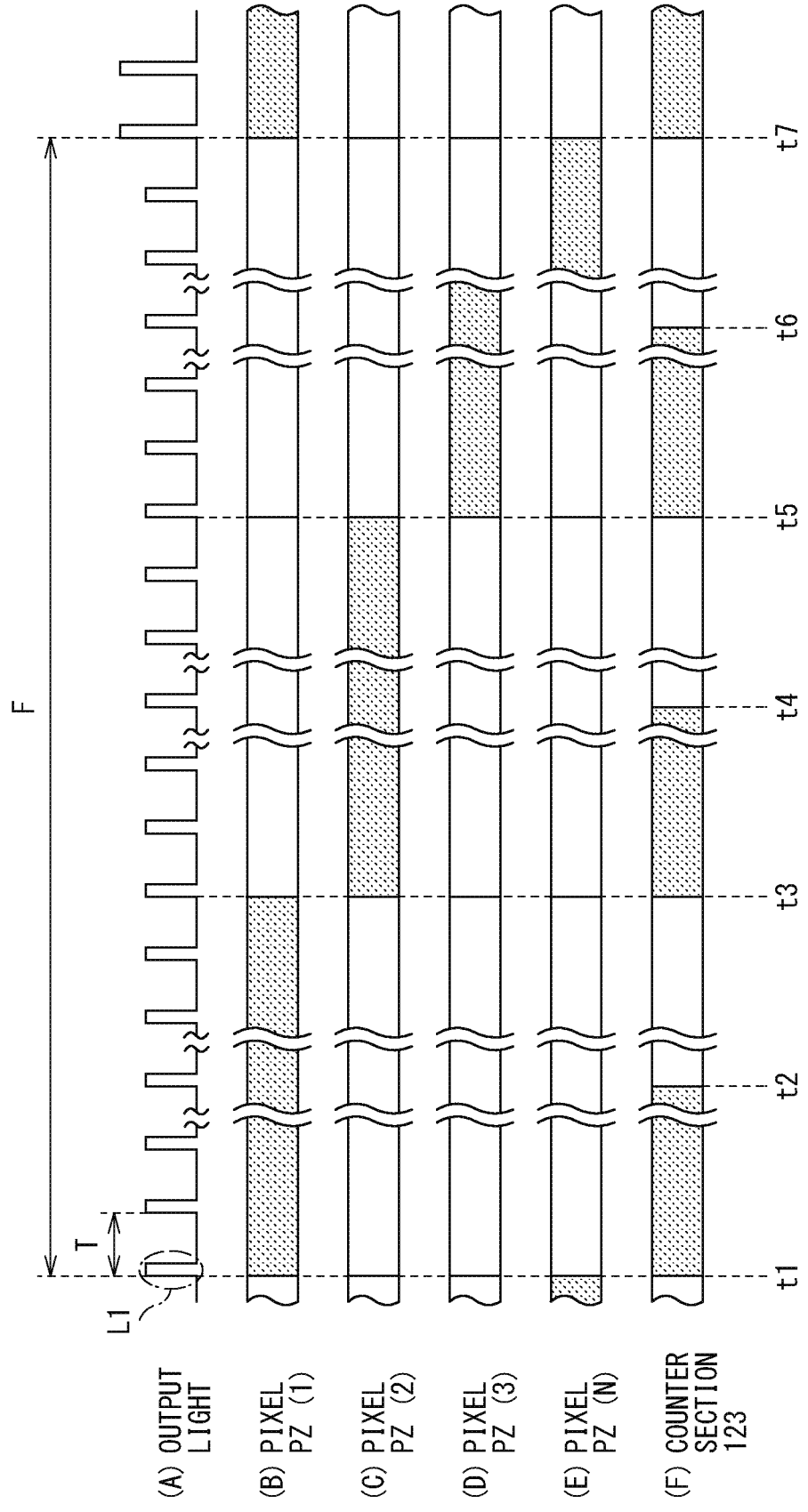

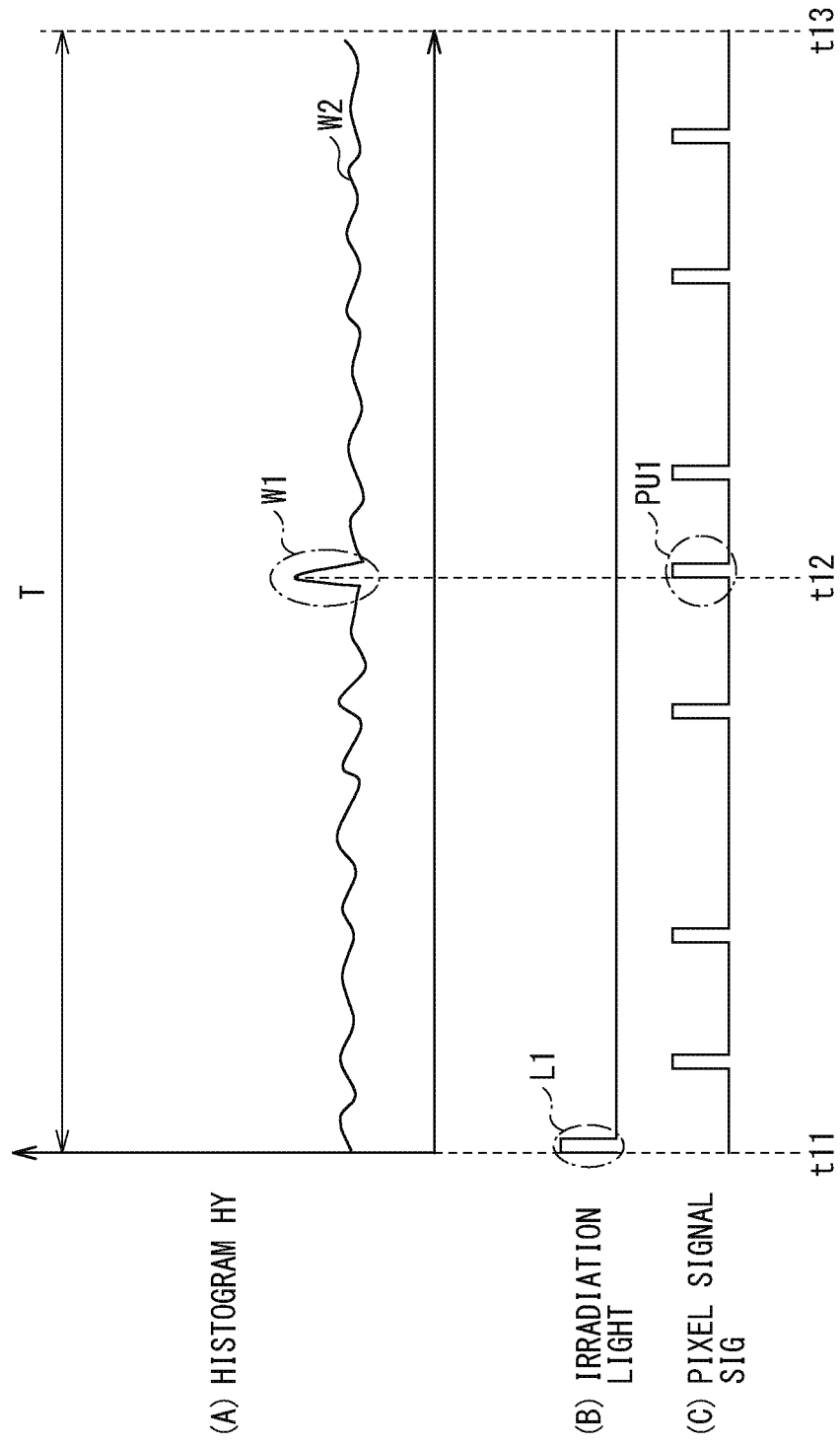

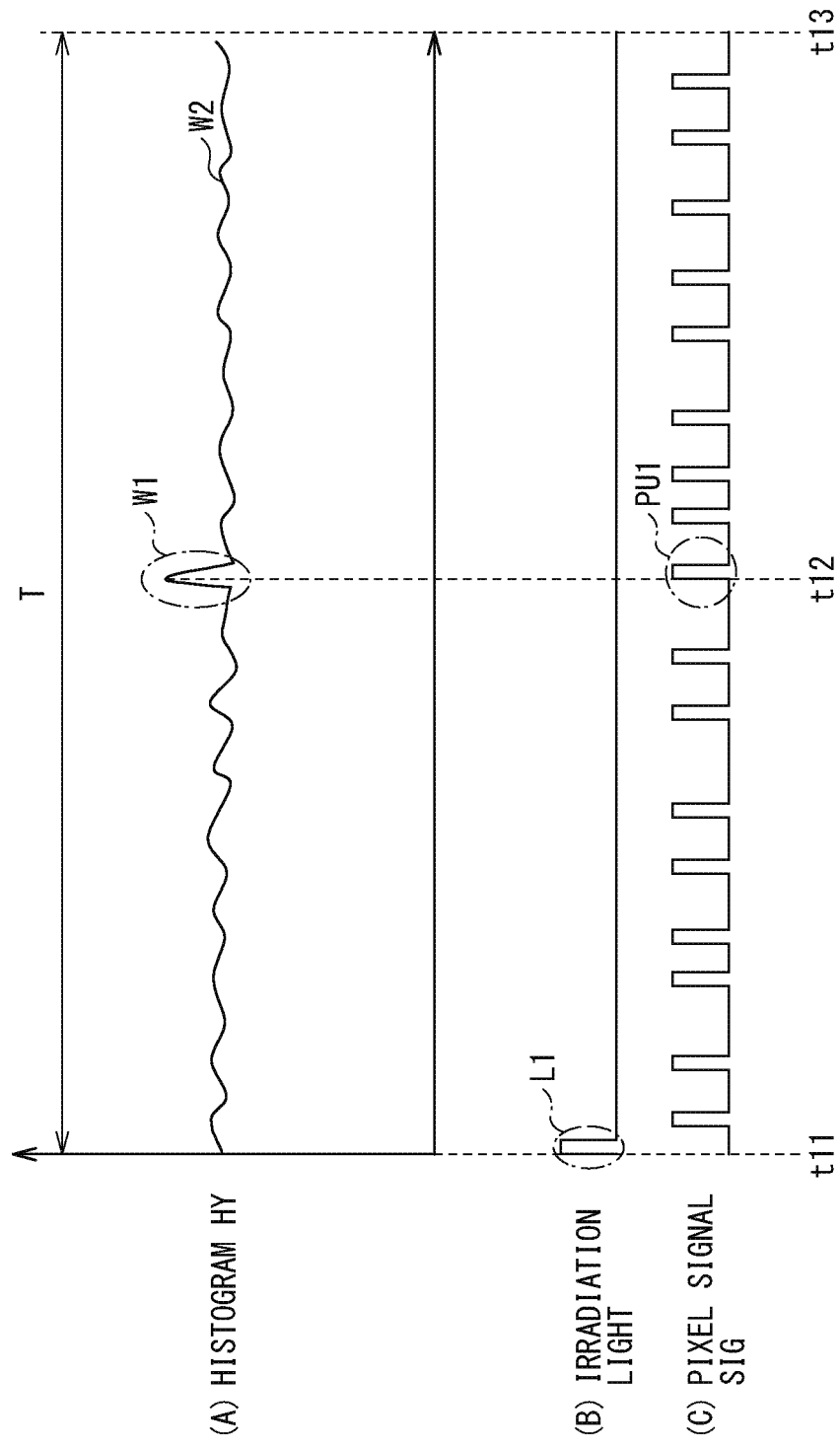

[FIG. 11]
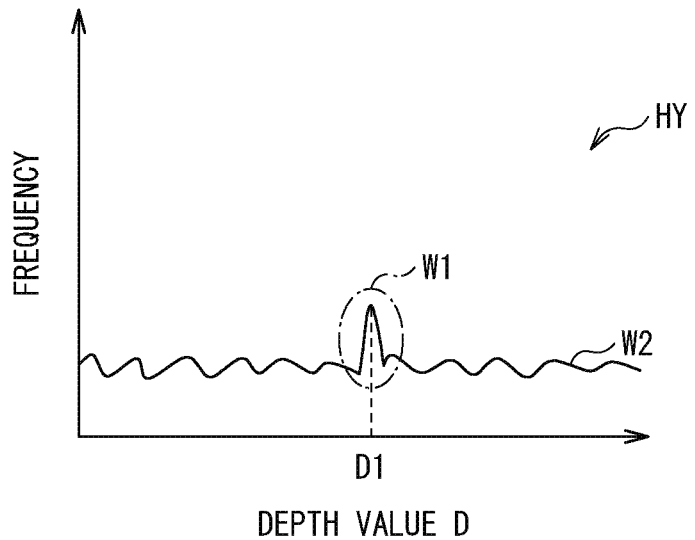
[FIG. 12]
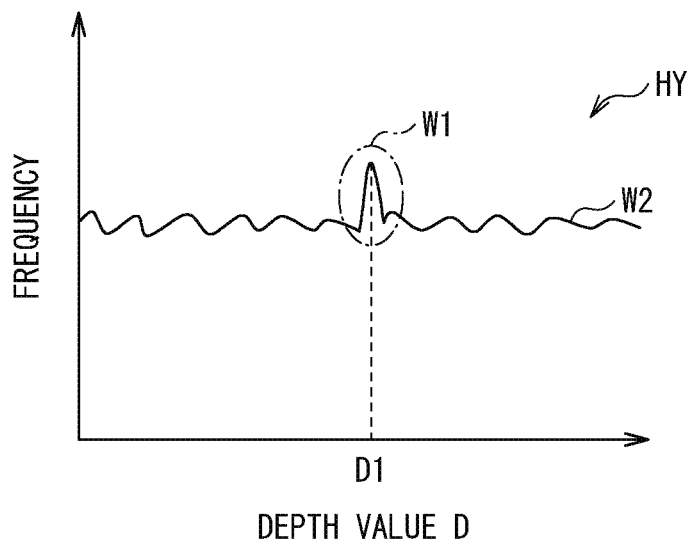

[FIG. 13]
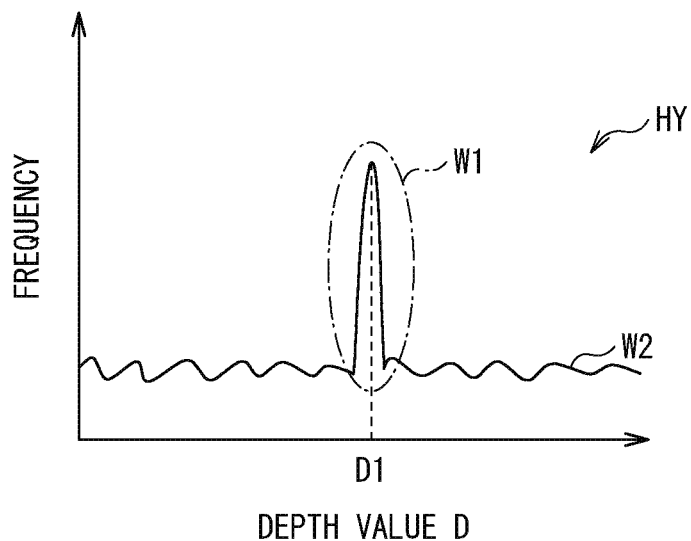
[FIG. 14]
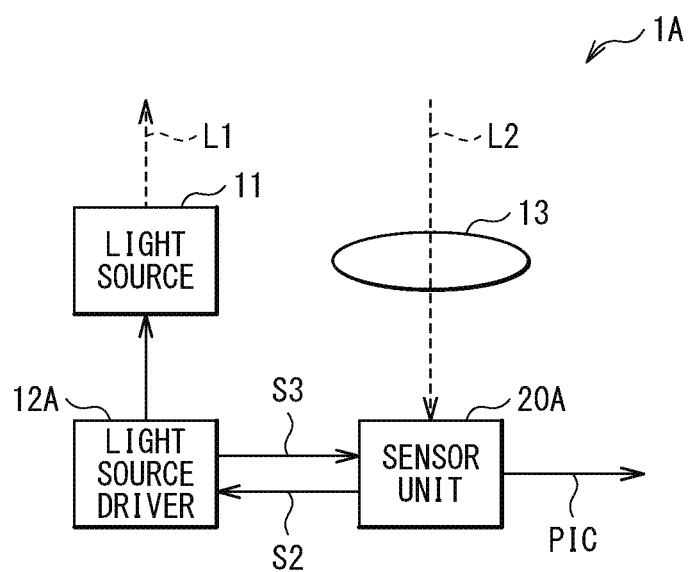

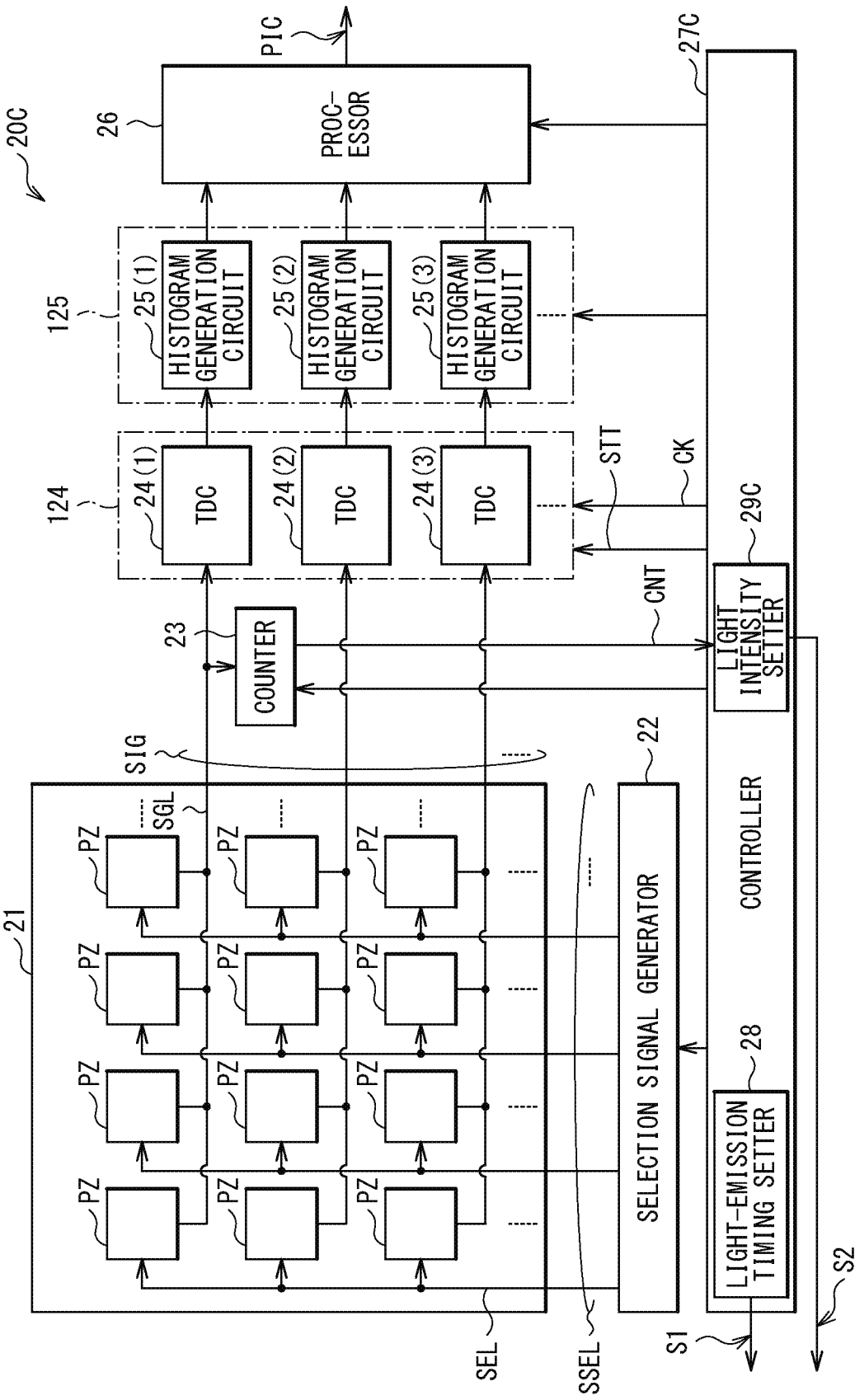

[FIG. 16]
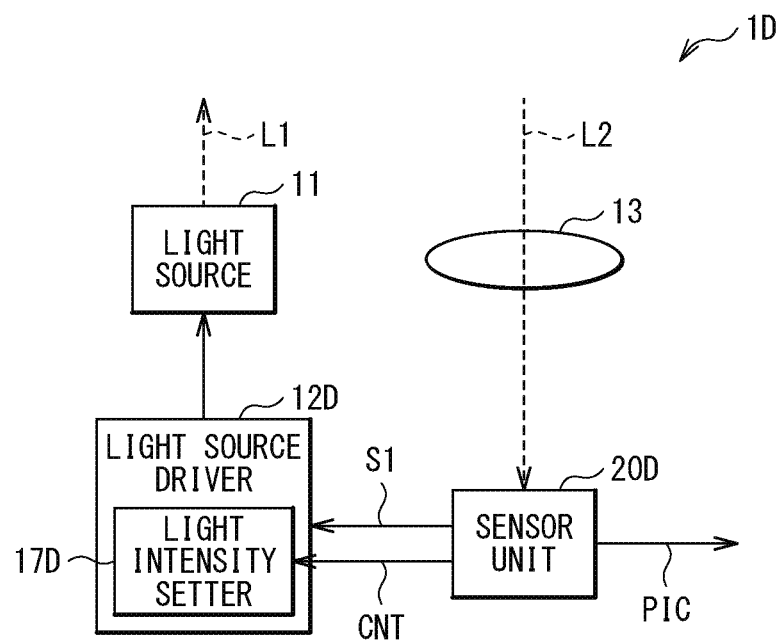

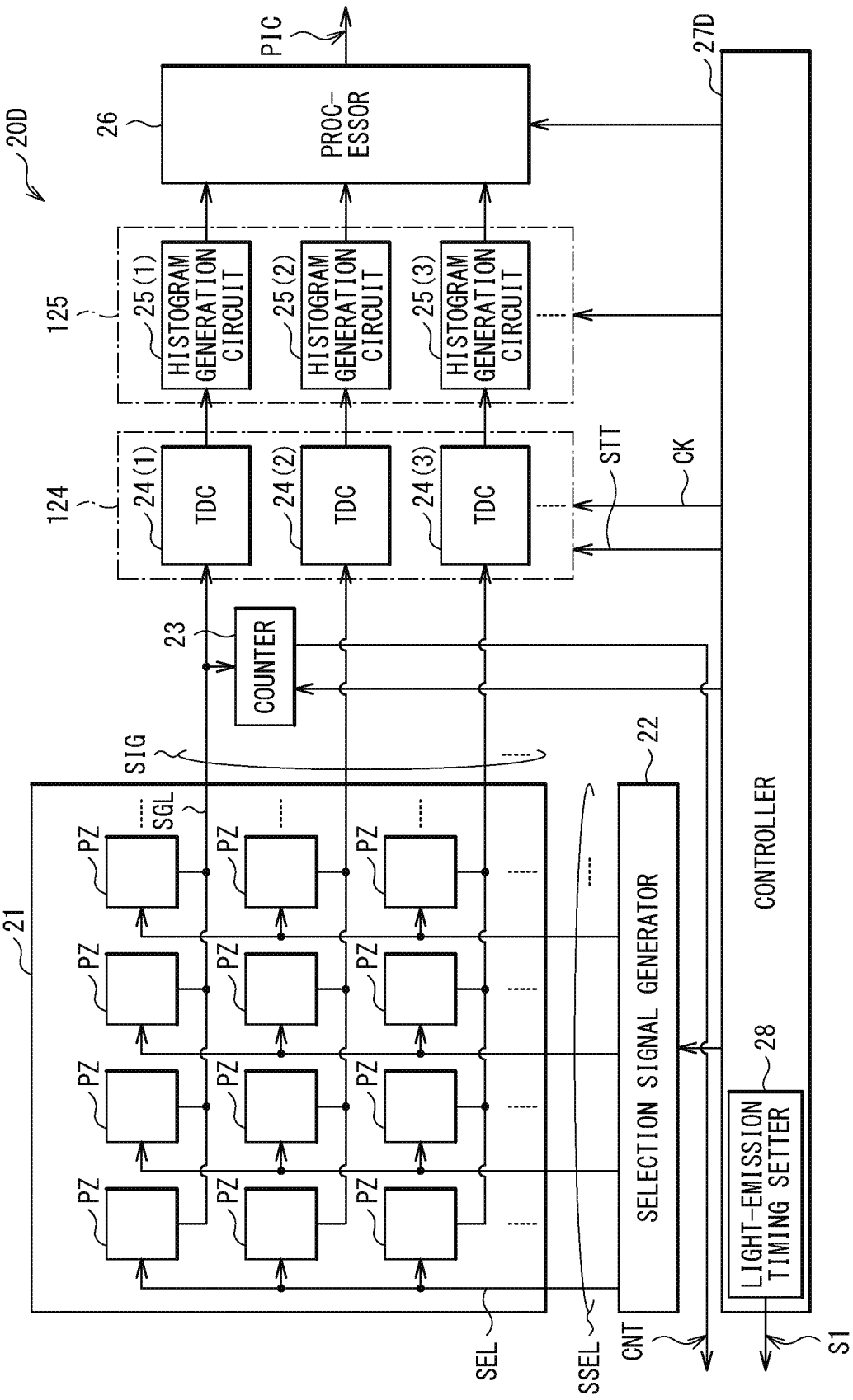
[FIG. 17]

[FIG. 18]
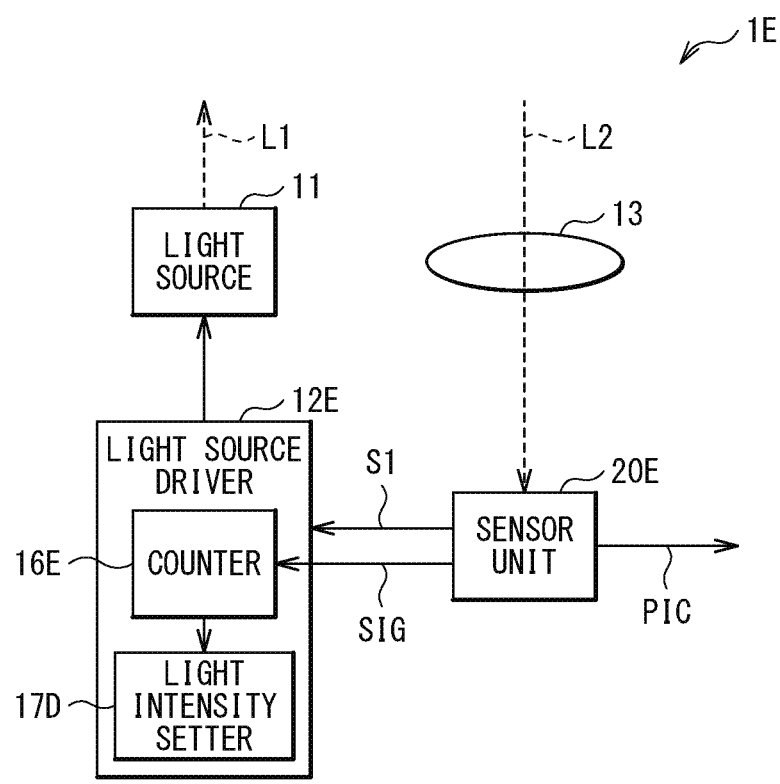

[FIG. 19]
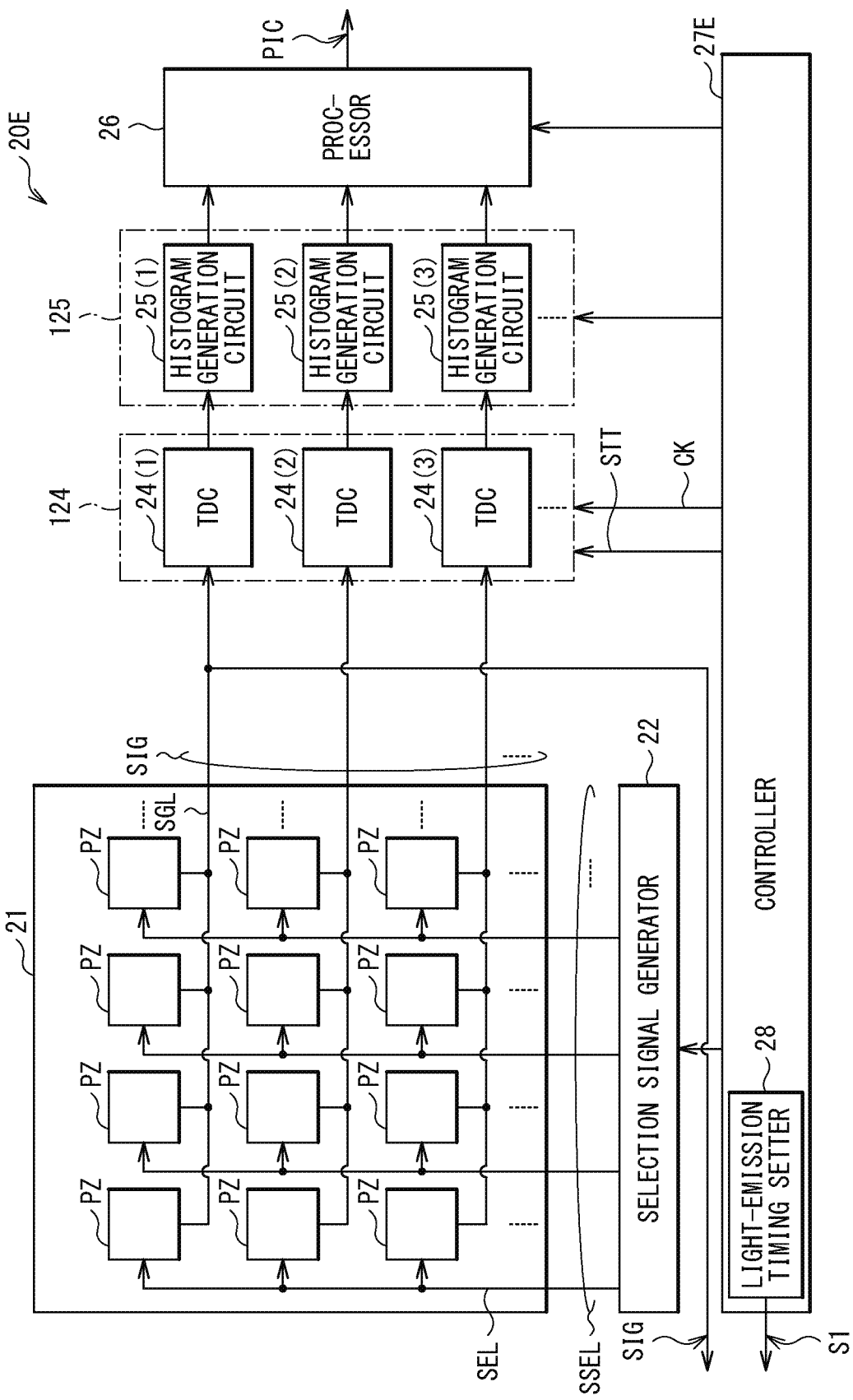

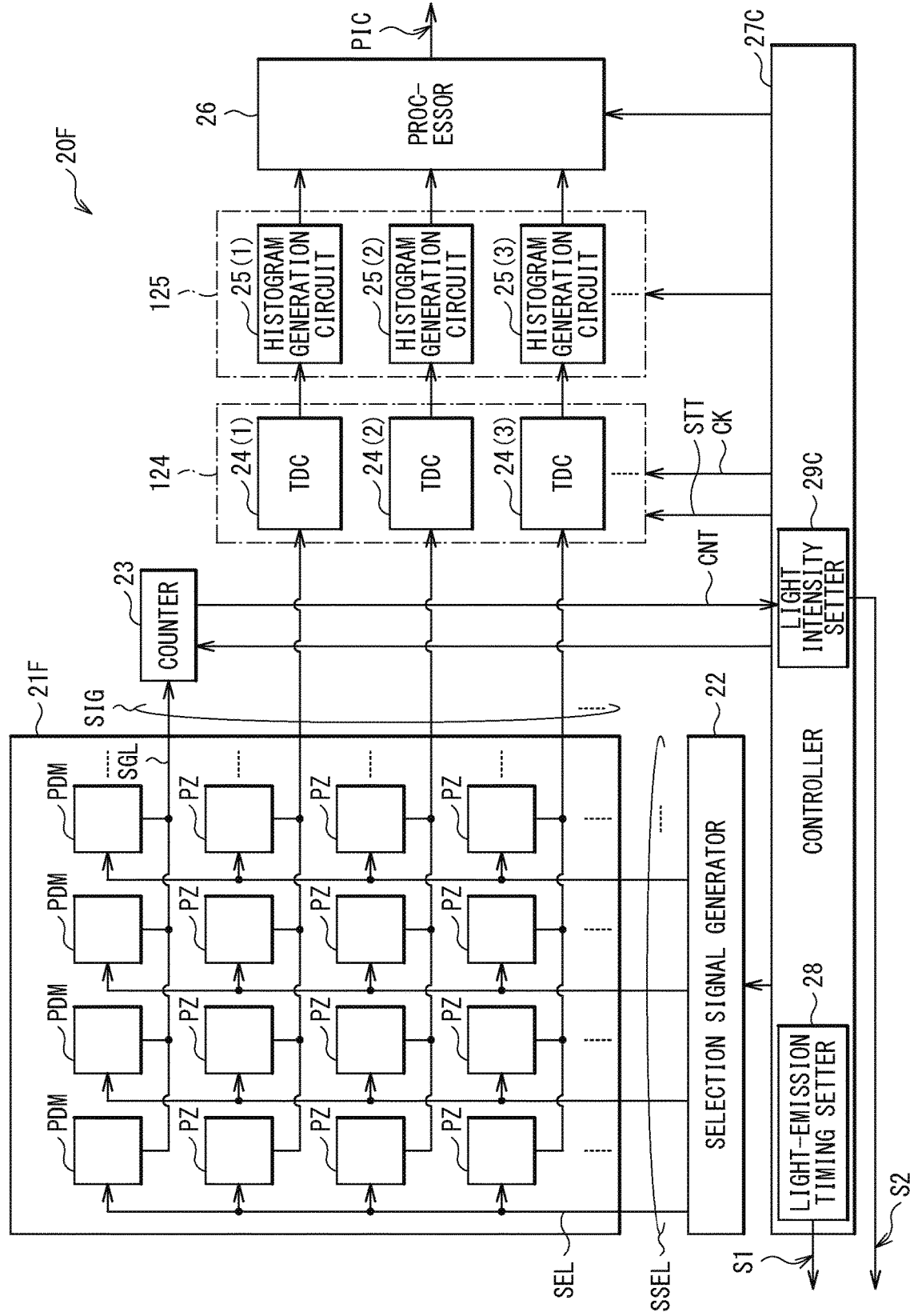
[FIG. 20]

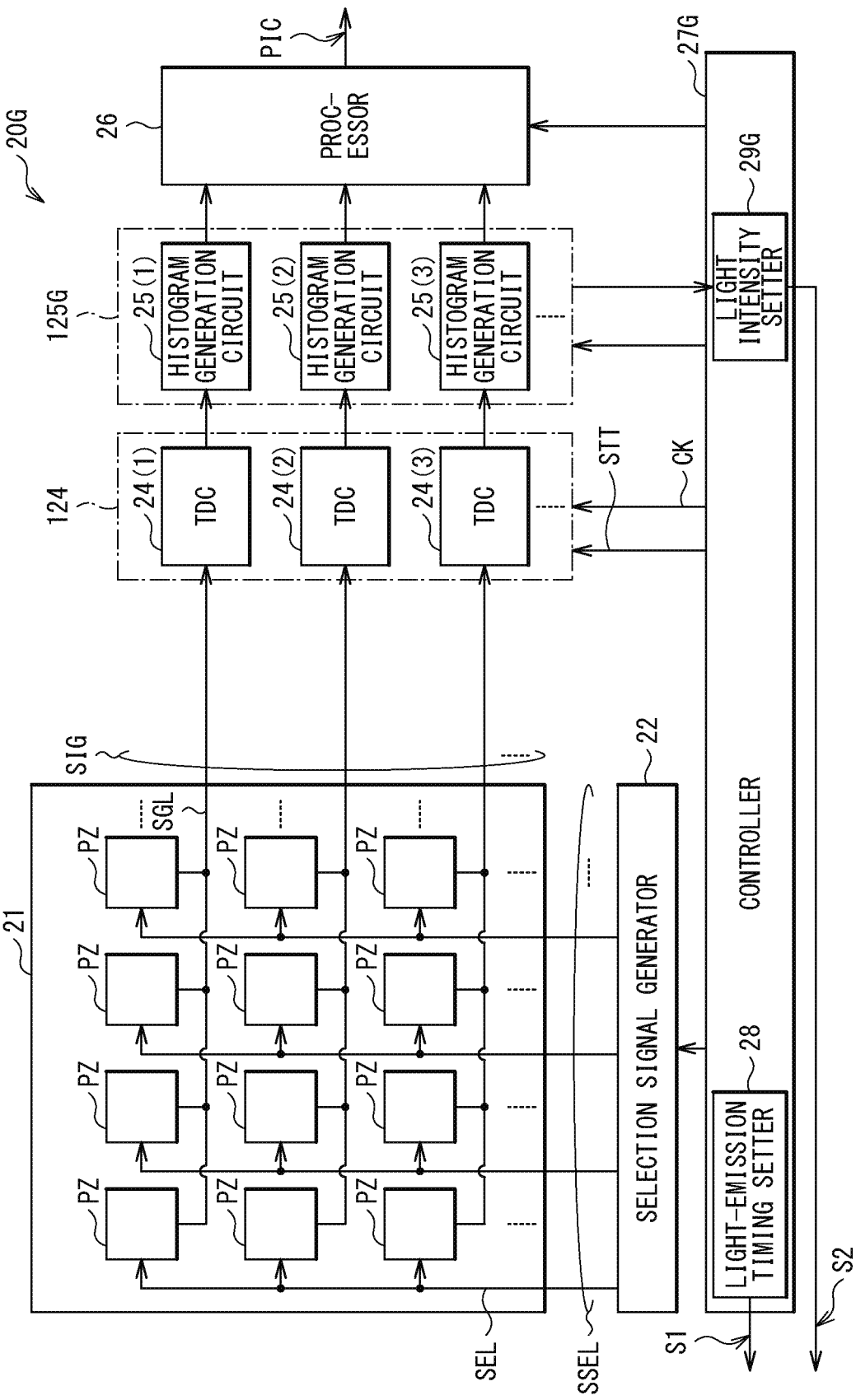
[FIG. 21]

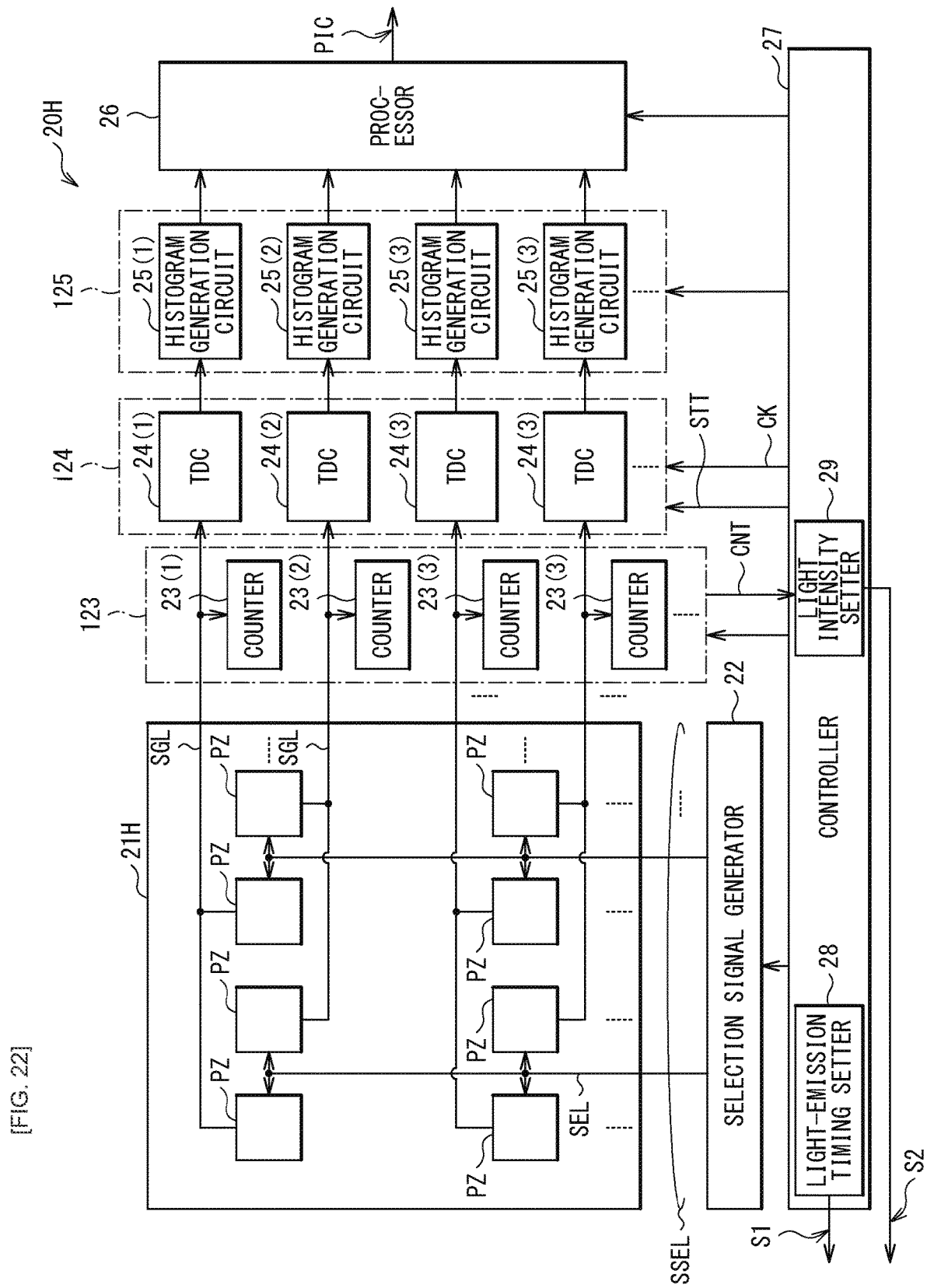
[FIG. 22]

[FIG. 23]
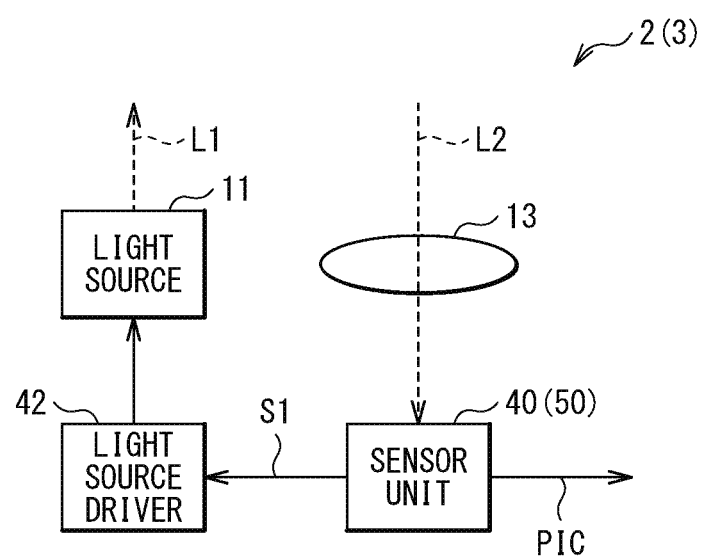

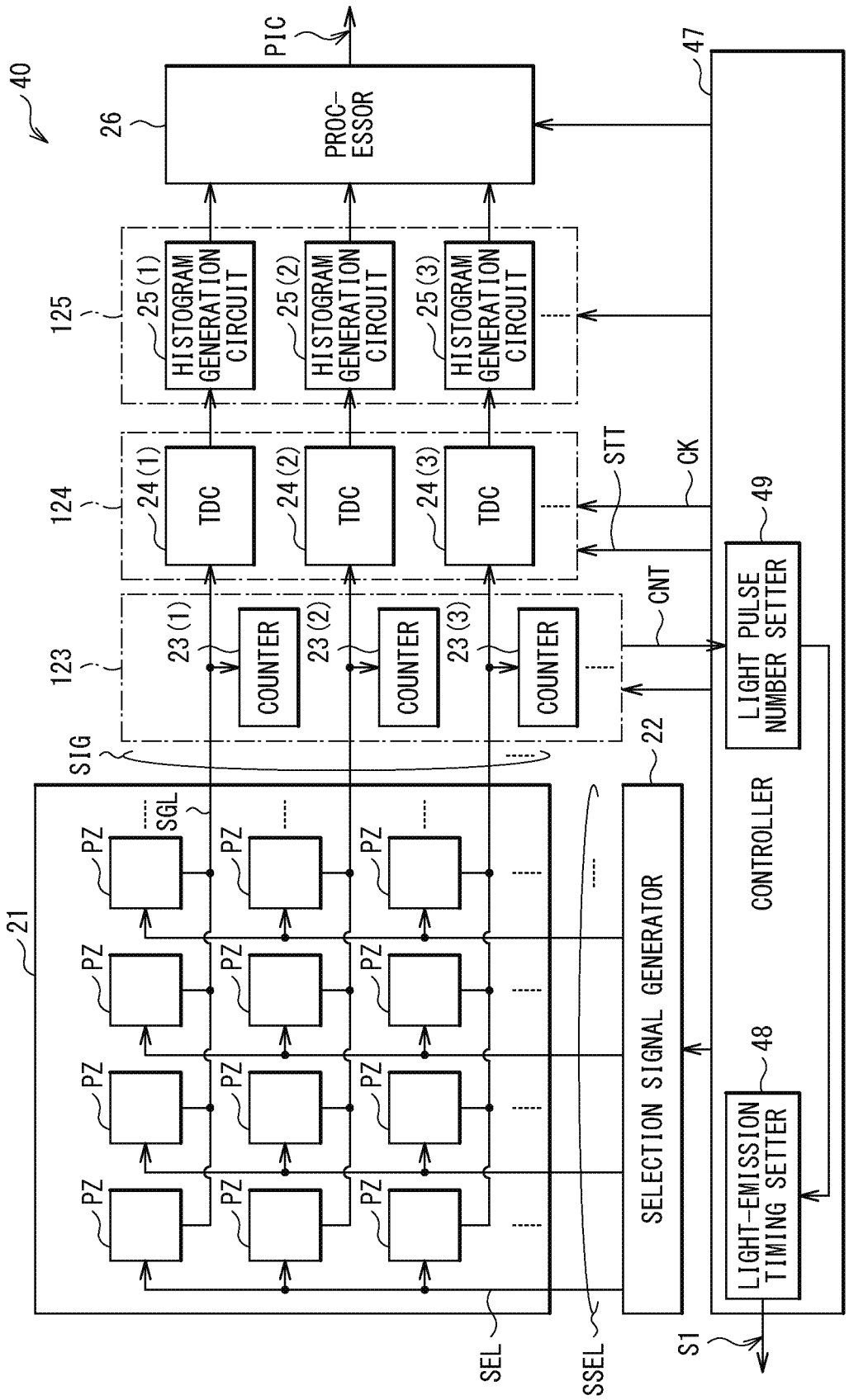

[FIG. 25]
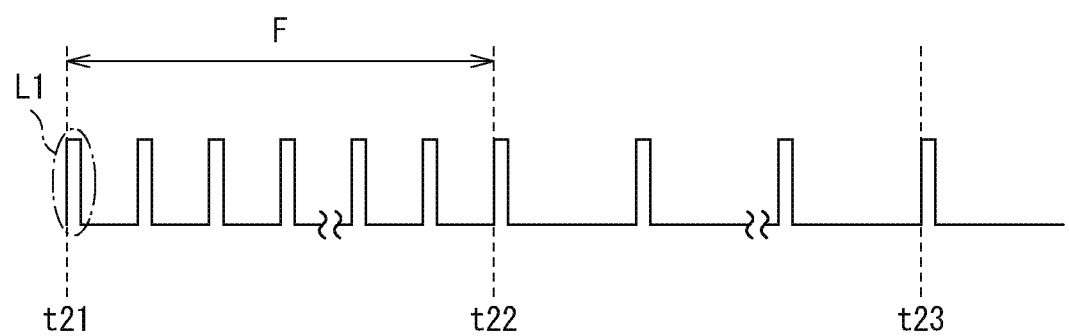

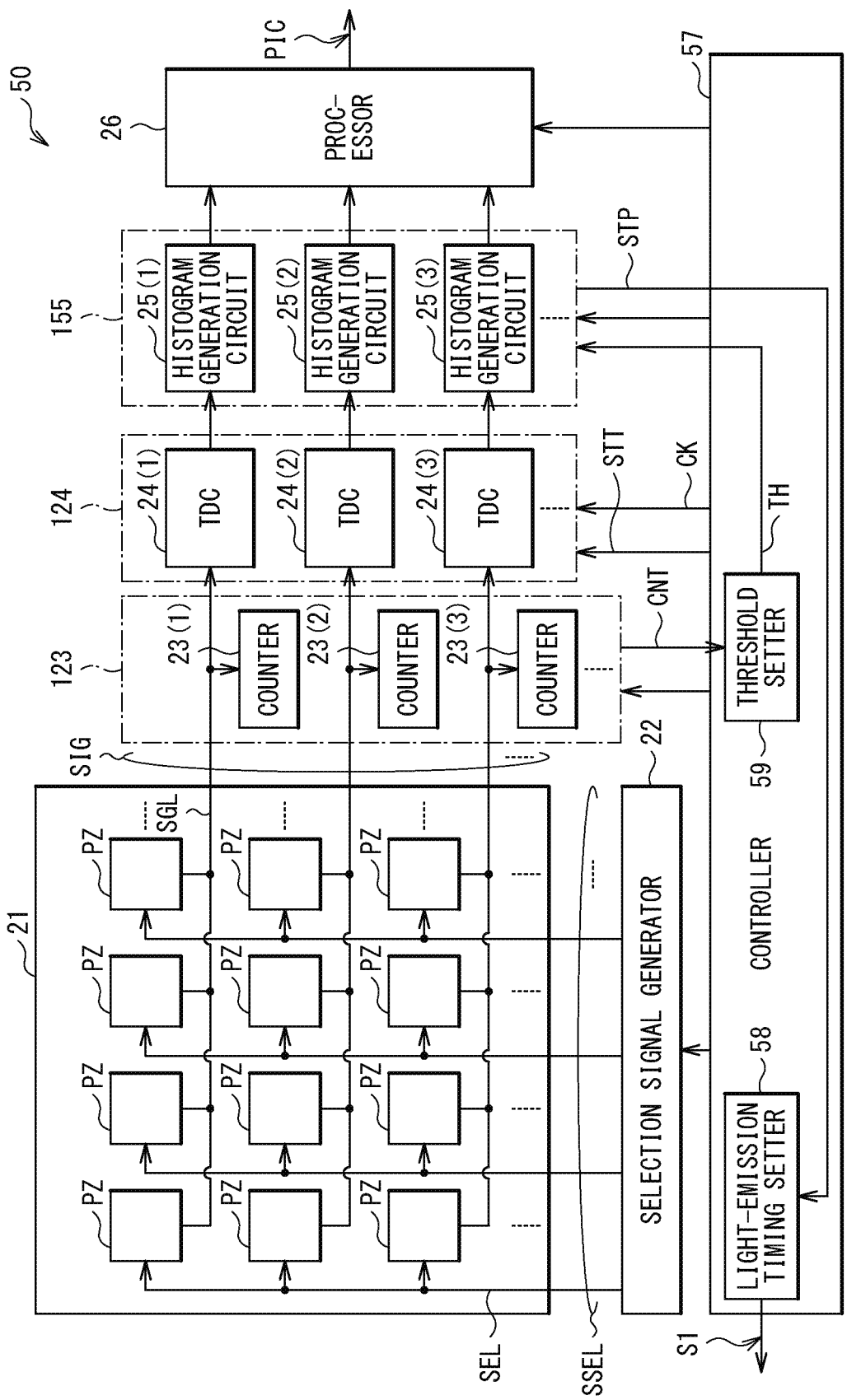
[FIG. 26]

[FIG. 27]
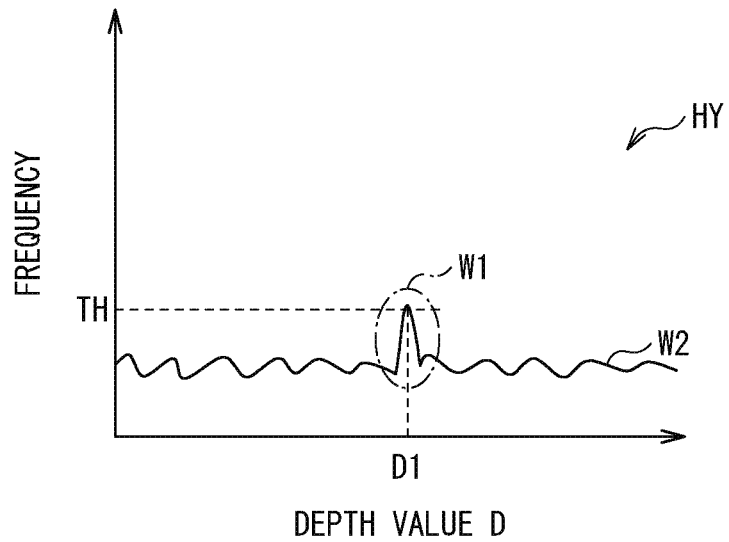
[FIG. 28]
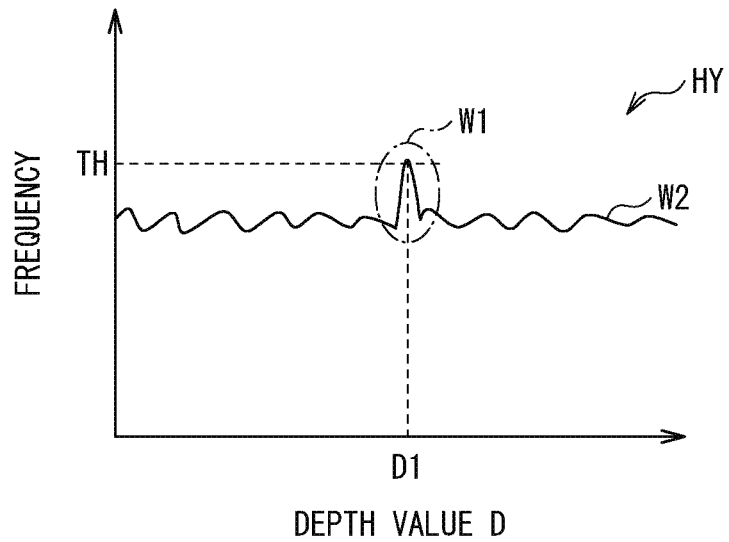

[FIG. 29]
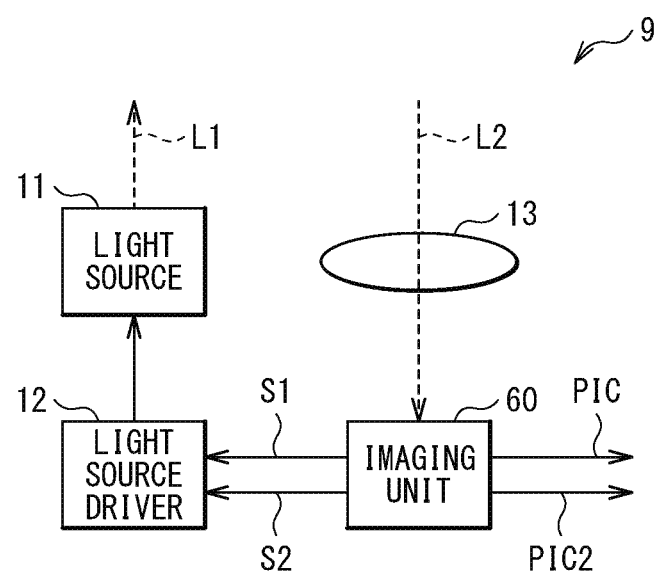

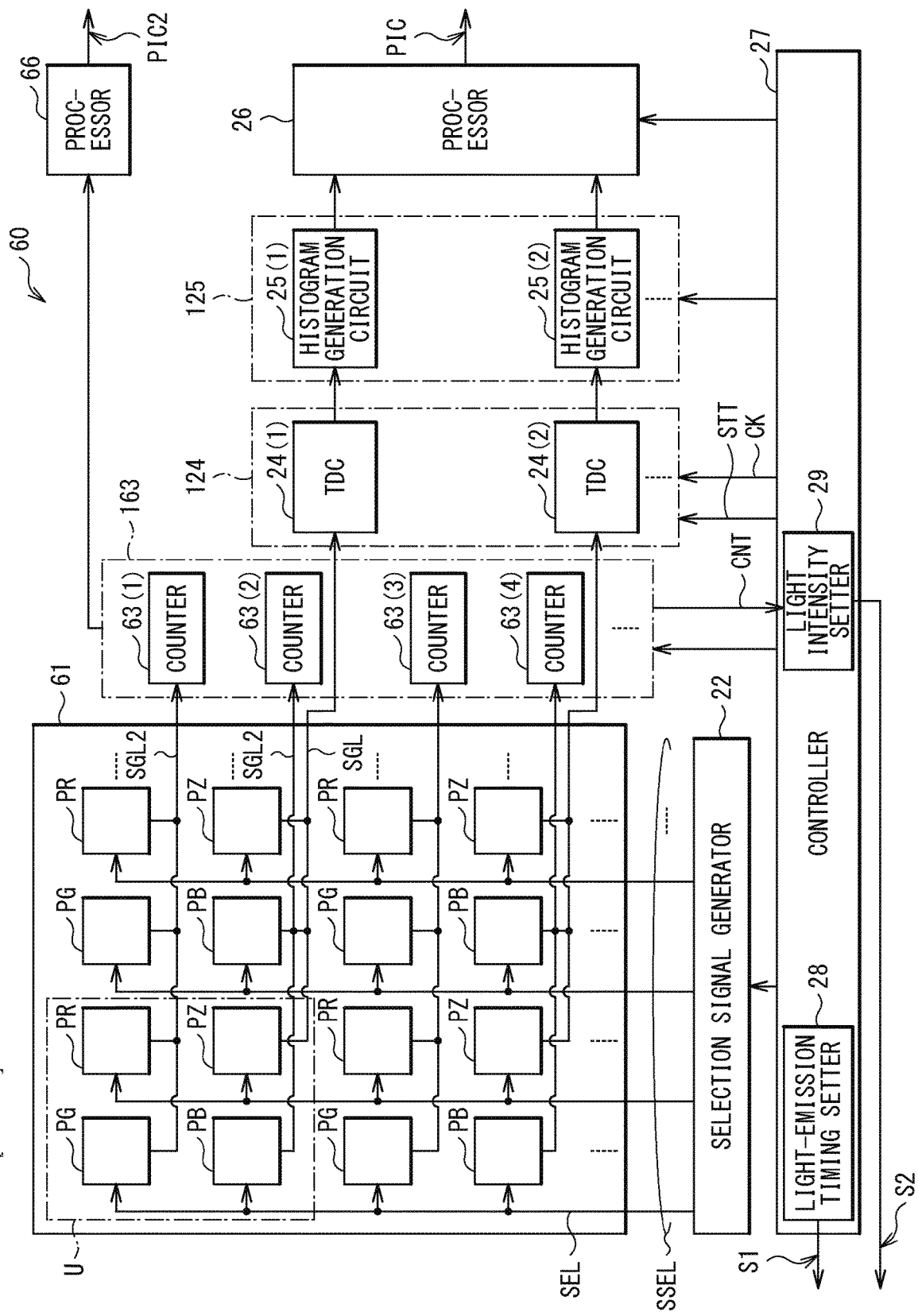

[FIG. 31]
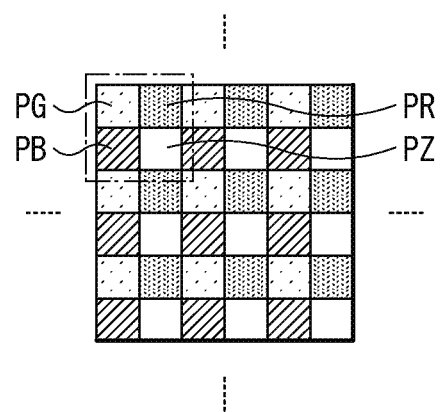

TIME MEASUREMENT APPARATUS

CROSS REFERENCE TO RELATED APPLICATIONS

This application is a U.S. National Phase of International Patent Application No. PCT/JP2019/016254 filed on Apr. 16, 2019, which claims priority benefit of Japanese Patent Application No. JP 2018-099515 filed in the Japan Patent Office on May 24, 2018. Each of the above-referenced applications is hereby incorporated herein by reference in its entirety.

TECHNICAL FIELD

The present disclosure relates to a time measurement apparatus that measures a time from a timing at which light is outputted to a timing at which the light is detected.

BACKGROUND ART

In measuring a distance to a measurement target object, a TOF (Time Of Flight) method is often used. The TOF method outputs light and detects reflected light reflected by the measurement target object. The TOF method then measures a time difference between the timing of the output of the light and the timing of the detection of the reflected light, and thereby measures the distance to the measurement target object (for example, see PTL 1).

CITATION LIST

Patent Literature

PTL 1: Japanese Unexamined Patent Application Publication No. 2010-91377

SUMMARY OF THE INVENTION

Meanwhile, in general, it is desired that electronic equipment be low in power consumption, and low power consumption is also expected from a time measurement apparatus.

It is desirable to provide a time measurement apparatus that makes it possible to reduce power consumption.

A first time measurement apparatus according to an embodiment of the present disclosure includes a pixel, a timing detector, a pulse number detector, and a controller. The pixel includes a light receiving element, and is configured to generate a pulse signal including a logic pulse on the basis of a light reception result in the light receiving element. The timing detector is configured to detect a light reception timing in the light receiving element on the basis of the pulse signal. The pulse number detector is configured to detect a pulse number of the logic pulse included in the pulse signal. The controller is configured to control, on the basis of the pulse number, an operation of a light source outputting a plurality of light pulses.

A second time measurement apparatus according to an embodiment of the present disclosure includes a first pixel, a second pixel, a timing detector, a pulse number detector, and a controller. The first pixel includes a first light receiving element, and is configured to generate a first pulse signal including a logic pulse on the basis of a light reception result in the first light receiving element. The second pixel includes a second light receiving element, and is configured to generate a second pulse signal including a logic pulse on the basis of a light reception result in the second light receiving element. The timing detector is configured to detect a light reception timing in the first light receiving element on the basis of the first pulse signal. The pulse number detector is configured to detect a pulse number of the logic pulse included in the second pulse signal. The controller is configured to control, on the basis of the pulse number, an operation of a light source outputting a plurality of light pulses.

In the first time measurement apparatus of the embodiment of the present disclosure, a pulse signal including a logic pulse is generated on the basis of the light reception result in the light receiving element, and a light reception timing in the light receiving element is detected on the basis of the pulse signal. Further, the pulse number of the logic pulse included in the pulse signal is detected, and the operation of the light source outputting a plurality of light pulses is controlled on the basis of the pulse number.

In the second time measurement apparatus of the embodiment of the present disclosure, a first pulse signal including a logic pulse is generated on the basis of the light reception result in the first light receiving element, and a light reception timing in the first light receiving element is detected on the basis of the first pulse signal. Further, a second pulse signal including a logic pulse is generated on the basis of the light reception result in the second light receiving element. Then, the pulse number of the logic pulse included in the second pulse signal is detected, and the operation of the light source outputting a plurality of light pulses is controlled on the basis of the pulse number.

According to the first time measurement apparatus and the second time measurement apparatus of the respective embodiments of the present disclosure, it is possible to reduce power consumption because the operation of the light source is controlled on the basis of the pulse number of the logic pulse included in the pulse signal. It is to be noted that the effects described above are not necessarily limitative, and any of effects described in the present disclosure may be provided.

BRIEF DESCRIPTION OF DRAWINGS

FIG. 1 is a configuration diagram illustrating a configuration example of a time measurement apparatus according to a first embodiment of the present disclosure.

FIG. 2 is a block diagram illustrating a configuration example of a sensor unit illustrated in FIG. 1.

FIG. 3 is a circuit diagram illustrating a configuration example of a pixel array illustrated in FIG. 2.

FIG. 4 is a circuit diagram illustrating a configuration example of an inverter illustrated in FIG. 3.

FIG. 5 is an explanatory diagram illustrating an example of a histogram generated by a histogram generation circuit illustrated in FIG. 2.

FIG. 6A is an explanatory diagram illustrating an operation example of a light intensity measurement unit illustrated in FIG. 2.

FIG. 6B is an explanatory diagram illustrating another operation example of the light intensity measurement unit illustrated in FIG. 2.

FIG. 6C is an explanatory diagram illustrating another operation example of the light intensity measurement unit illustrated in FIG. 2.

FIG. 7 is an explanatory diagram illustrating an implementation example of the sensor unit illustrated in FIG. 2.

FIG. 8 is a timing waveform chart illustrating an operation example of the time measurement apparatus illustrated in FIG. 1.

FIG. 9 is a timing chart illustrating an operation example of the time measurement apparatus in a dark environment.

FIG. 10 is a timing chart illustrating an operation example of the time measurement apparatus in a bright environment.

FIG. 11 is an explanatory diagram illustrating an example of a histogram in a dark environment.

FIG. 12 is an explanatory diagram illustrating an example of a histogram in a bright environment.

FIG. 13 is an explanatory diagram illustrating an example of a histogram according to a comparative example.

FIG. 14 is a configuration diagram illustrating a configuration example of a time measurement apparatus according to a modification example.

FIG. 15 is a block diagram illustrating a configuration example of a sensor unit according to another modification example.

FIG. 16 is a configuration diagram illustrating a configuration example of a time measurement apparatus according to another modification example.

FIG. 17 is a block diagram illustrating a configuration example of a sensor unit illustrated in FIG. 16.

FIG. 18 is a configuration diagram illustrating a configuration example of a time measurement apparatus according to another modification example.

FIG. 19 is a block diagram illustrating a configuration example of a sensor unit illustrated in FIG. 18.

FIG. 20 is a block diagram illustrating a configuration example of a sensor unit according to another modification example.

FIG. 21 is a block diagram illustrating a configuration example of a sensor unit according to another modification example.

FIG. 22 is a block diagram illustrating a configuration example of a sensor unit according to another modification example.

FIG. 23 is a configuration diagram illustrating a configuration example of a time measurement apparatus according to an embodiment.

FIG. 24 is a block diagram illustrating a configuration example of a sensor unit according to a second embodiment.

FIG. 25 is an explanatory diagram illustrating an example of a light pulse according to the second embodiment.

FIG. 26 is a block diagram illustrating a configuration example of a sensor unit according to a third embodiment.

FIG. 27 is an explanatory diagram illustrating an example of a histogram in a dark environment.

FIG. 28 is an explanatory diagram illustrating an example of a histogram in a bright environment.

FIG. 29 is a configuration diagram illustrating a configuration example of an imaging apparatus according to an application example.

FIG. 30 is a block diagram illustrating a configuration example of an imaging unit illustrated in FIG. 29.

FIG. 31 is an explanatory diagram illustrating a layout example of pixels in a pixel array illustrated in FIG. 30.

MODES FOR CARRYING OUT THE INVENTION

In the following, some embodiments of the present disclosure are described in detail with reference to the drawings. It is to be noted that the descriptions are given in the following order.

1. First Embodiment
2. Second Embodiment
3. Third Embodiment
4. Application Example (Application to Imaging Apparatus)

1. First Embodiment

Configuration Example

FIG. 1 illustrates a configuration example of a time measurement apparatus (a time measurement apparatus 1) according to a first embodiment. The time measurement apparatus 1 outputs light, detects reflected light reflected by a measurement target object, and measures a time difference between a timing at which the light is outputted and a timing at which the reflected light is detected. The time measurement apparatus 1 includes a light source 11, a light source driver 12, a lens 13, and a sensor unit 20.

The light source 11 outputs a light pulse L1 toward the measurement target object, and includes, for example, a pulse laser light source.

The light source driver 12 drives the light source 11 on the basis of an instruction from the sensor unit 20. Specifically, on the basis of a light-emission trigger signal S1 supplied from the sensor unit 20, the light source driver 12 controls an operation of the light source 11 to cause the light source 11 to emit light at a timing corresponding to a trigger pulse included in the light-emission trigger signal S1. Further, the light source driver 12 has a function of controlling, on the basis of a light-intensity control signal S2 supplied from the sensor unit 20, a light intensity of the light pulse L1 to be outputted by the light source 11.

The lens 13 forms an image on a sensor surface of the sensor unit 20. A light pulse (a reflected light pulse L2) reflected by the measurement target object is to enter the lens 13.

The sensor unit 20 detects the reflected light pulse L2 and thereby generates a depth image PIC including information about the distance to the measurement target object. Each of a plurality of pixel values included in the depth image PIC indicates a value relating to the depth (a depth value D). The sensor unit 20 then outputs the generated depth image PIC. Further, the sensor unit 20 has a function of generating the light-emission trigger signal S1 and the light-intensity control signal S2 and supplying the light-emission trigger signal S1 and the light-intensity control signal S2 to the light source driver 12.

FIG. 2 illustrates a configuration example of the sensor unit 20. The sensor unit 20 includes a pixel array 21, a selection signal generator 22, a counter section 123, a time measurement section 124, a histogram generator 125, a processor 26, and a controller 27.

The pixel array 21 includes a plurality of pixels PZ arranged in a matrix.

FIG. 3 illustrates a configuration example of the pixel array 21. FIG. 3 illustrates four (=2×2) of the pixels PZ of the pixel array 21 adjacent to each other. The pixel array 21 includes a plurality of selection lines SEL and a plurality of signal lines SGL. Each of the plurality of selection lines SEL extends in a vertical direction in FIGS. 2 and 3, and has one end coupled to the selection signal generator 22, as illustrated in FIG. 2. A selection signal SSEL is applied to each of the selection lines SEL by the selection signal generator 22. Each of the plurality of signal lines SGL extends in a horizontal direction in FIGS. 2 and 3, and has one end coupled to the counter section 123 and the time measurement section 124, as illustrated in FIG. 2. The pixels PZ each include a light receiving element 31, transistors 32 and 33, and an inverter 34.

The light receiving element 31 is a photodiode serving to detect light, and includes, for example, a single-photon avalanche diode (SPAD). A cathode of the light receiving element 31 is coupled to drains of the transistors 32 and 33 and an input terminal of the inverter 34, and an anode of the light receiving element 31 is supplied with a predetermined bias voltage Vbias.

The transistor 32 is a P-type MOS (Metal Oxide Semiconductor) transistor. A source of the transistor 32 is supplied with a power supply voltage Vdd, a gate of the transistor 32 is supplied with a voltage Vg1, and the drain of the transistor 32 is coupled to the cathode of the light receiving element 31, the drain of the transistor 33, and the input terminal of the inverter 34. In a case where the pixel array 21 performs an operation, the transistor 32 functions as a constant current source for passing a predetermined current corresponding to the voltage Vg1 through the light receiving element 31. Further, in a case where the pixel array 21 does not perform any operation, the voltage Vg1 rises to a high level, and the transistor 32 is thereby set to an off-state.

The transistor 33 is an N-type MOS transistor. A source of the transistor 33 is grounded, a gate of the transistor 33 is supplied with a voltage Vg2, and the drain of the transistor 33 is coupled to the cathode of the light receiving element 31, the drain of the transistor 32, and the input terminal of the inverter 34. In the case where the pixel array 21 performs an operation, the voltage Vg2 drops to a low level, and the transistor 33 is thereby set to an off-state. Further, in the case where the pixel array 21 does not perform any operation, the voltage Vg2 rises to a high level, and the transistor 33 is thereby set to an on-state.

The inverter 34 inverts the voltage at the input terminal, and outputs the inverted voltage from an output terminal. The inverter 34 also has a function of setting an output impedance to a high impedance on the basis of the selection signal SSEL inputted to a control terminal. The input terminal of the inverter 34 is coupled to the cathode of the light receiving element 31 and the drains of the transistors 32 and 33. The control terminal of the inverter 34 is coupled to the selection line SEL, and the output terminal of the inverter 34 is coupled to the signal line SGL.

FIG. 4 illustrates a configuration example of the inverter 34. The inverter 34 includes transistors 35 to 38 and an inverter 39.

The transistors 35 and 36 are P-type MOS transistors. A source of the transistor 35 is supplied with a power supply voltage Vdd, a gate of the transistor 35 is coupled to an output terminal of the inverter 39, and a drain of the transistor 35 is coupled to a source of the transistor 36. The source of the transistor 36 is coupled to the drain of the transistor 35, a gate of the transistor 36 is coupled to the input terminal of the inverter 34, and a drain of the transistor 36 is coupled to the output terminal of the inverter 34. The transistors 37 and 38 are N-type MOS transistors. A drain of the transistor 37 is coupled to the output terminal of the inverter 34, a gate of the transistor 37 is coupled to the input terminal of the inverter 34, and a source of the transistor 37 is coupled to a drain of the transistor 38. The drain of the transistor 38 is coupled to the source of the transistor 37, a gate of the transistor 38 is coupled to the control terminal of the inverter 34, and a source of the transistor 38 is grounded. An input terminal of the inverter 39 is coupled to the control terminal of the inverter 34, and the output terminal of the inverter 39 is coupled to the gate of the transistor 35.

With this configuration, in a case where the voltage of the selection signal SSEL inputted to the control terminal of the inverter 34 is at a high level, the inverter 34 inverts the voltage at the input terminal and outputs the inverted voltage from the output terminal. Further, in a case where the voltage of the selection signal SSEL inputted to the control terminal of the inverter 34 is at a low level, the inverter 34 sets the output impedance to a high impedance.

In the pixel array 21, one column of pixels PZ of the plurality of pixels PZ is selected on the basis of the selection signal SSEL. Specifically, the selection signal generator 22 sets a voltage of one selection signal SSEL out of a plurality of selection signals SSEL to a high level, whereby one column of pixels PZ that is coupled to the selection line SEL supplied with that high-level selection signal SSEL is selected. In each of the selected pixels PZ, if a light pulse (the reflected light pulse L2) enters the light receiving element 31, a current flows through the light receiving element 31 to cause a transient drop in voltage at the cathode of the light receiving element 31. The inverter 34 outputs a pulse PU from the output terminal on the basis of the voltage at the cathode of the light receiving element 31. In this way, each of the selected pixels PZ outputs a pixel signal SIG including the pulse PU corresponding to the entering reflected light pulse L2.

On the basis of a control signal supplied from the controller 27, the selection signal generator 22 (FIG. 2) generates a plurality of selection signals SSEL and supplies those plurality of selection signals SSEL to respective plurality of columns of pixels PZ in the pixel array 21. The selection signal generator 22 sets a voltage of one selection signal SSEL out of the plurality of selection signals SSEL to a high level sequentially, and thereby selects a plurality of pixels PZ on a column-by-column basis sequentially.

The counter section 123 includes a plurality of counters 23 (counters 23(1), 23(2), 23(3), . . . ). The plurality of counters 23 are respectively coupled to the plurality of signal lines SGL in the pixel array 21. Each of the plurality of counters 23 counts the number of the pulses PU included in the pixel signal SIG supplied from the pixel array via the signal line SGL. The counter section 123 then supplies count results (count values CNT) in the plurality of counters 23 to the controller 27.

The time measurement section 124 includes a plurality of TDCs (Time to Digital Converters) 24 (TDCs 24(1), 24(2), 24(3), . . . ). The plurality of TDCs 24 are respectively coupled to the plurality of signal lines SGL in the pixel array 21. On the basis of a control signal supplied from the controller 27, each of the plurality of TDCs 24 measures timings of the pulses PU included in the pixel signal SIG supplied from the pixel array 21 via the signal line SGL. Specifically, on the basis of a start signal STT supplied from the controller 27, each TDC 24 starts counting clock pulses of a clock signal CK supplied from the controller 27. Then, each time the pulse PU appears on the pixel signal SIG, the TDC 24 outputs a count value at that time. A timing indicated by the start signal STT corresponds to a light emission timing of the light source 11. Therefore, the count value outputted by the TDC 24 corresponds to a time difference between a timing at which the light source 11 outputs the light pulse L1 and a timing at which the pixel PZ detects the reflected light pulse L2, in other words, a distance between the time measurement apparatus 1 and the measurement target object. That is, the count value outputted by the TDC 24 is a depth value D. In this way, the time measurement section 124 outputs the depth value D each time the pulse PU appears on the pixel signal SIG.

The histogram generator 125 includes a plurality of histogram generation circuits 25 (histogram generation circuits 25(1), 25(2), 25(3), . . . ). The plurality of histogram generation circuits 25 are provided respectively in correspondence with the plurality of TDCs 24. The histogram generation circuit 25(1) generates, on the basis of a control signal supplied from the controller 27, a histogram HY of a depth value D supplied from the TDC 24(1). The histogram generation circuit 25(2) generates, on the basis of a control signal supplied from the controller 27, a histogram HY of a depth value D supplied from the TDC 24(2). The same applies to the other histogram generation circuits 25.

FIG. 5 illustrates an example of the histograms HY generated by the histogram generation circuits 25. The horizontal axis represents the depth value D, and the vertical axis represents the frequency of occurrence of the depth value D. In this example, the histogram HY has a peak W1 and floors W2 other than the peak W1.

The peak W1 is based on the pulse PU corresponding to the reflected light pulse L2. A central value D1 of the peak W1 corresponds to, for example, a time difference between the timing at which the light source 11 outputs the light pulse L1 and the timing at which the pixel PZ detects the reflected light pulse L2, and corresponds to the distance between the time measurement apparatus 1 and the measurement target object. That is, for example, the central value D1 is a desired depth value D to be measured by the time measurement apparatus 1. It is possible to increase the height of the peak W1 by, for example, increasing the light intensity of the light pulse L1 to be outputted by the light source 11.

The floors W2 are based on pulses PU that occur at random timings. That is, environmental light, as well as the reflected light pulse L2, enters each pixel PZ, which causes each pixel PZ to generate a pulse PU corresponding to the environmental light. Further, even in a case where no light enters, each pixel PZ may sometimes generate a pulse PU corresponding to, for example, a so-called dark current. These pulses PU occur at random timings, and thus appear as the floors W2 in the histogram HY as illustrated in FIG. 5. For example, in a dark environment, the floors W2 are low, whereas in a bright environment, the floors W2 are high. It is desirable that the floors W2 be low because the floors W2 are noise in detecting the position of the peak W1. In the time measurement apparatus 1, as will be described later, the light intensity of the light pulse L1 is adjusted to cause the peak W1 to exceed the floors W2 in height and also prevent the peak W1 from becoming excessively greater in height than the floors W2.

Each of the plurality of histogram generation circuits 25 generates such a histogram HY. The histogram generator 125 then supplies information about the histograms HY generated by the histogram generation circuits 25 (for example, the central value D1 of each of the histograms HY) to the processor 26.

The processor 26 generates the depth image PIC on the basis of a control signal supplied from the controller 27 and the information about the plurality of histograms HY supplied from the histogram generator 125. Each of a plurality of pixel values included in the depth image PIC indicates a value relating to the depth (a depth value D). The processor 26 then outputs the generated depth image PIC.

The controller 27 controls the operation of the time measurement apparatus 1 by supplying control signals to the selection signal generator 22, the counter section 123, the time measurement section 124, the histogram generator 125, and the processor 26, and supplying the light-emission trigger signal S1 and the light-intensity control signal S2 to the light source driver 12. The controller 27 includes a light-emission timing setter 28 and a light intensity setter 29.

The light-emission timing setter 28 generates the light-emission trigger signal S1 instructing light emission timing in the light source 11. The light-emission trigger signal S1 includes a plurality of trigger pulses. The controller 27 supplies the light-emission trigger signal S1 to the light source driver 12, and thereby controls the operation of the light source 11 to cause the light source 11 to emit light at timings corresponding to the trigger pulses included in the light-emission trigger signal S1.

The light intensity setter 29 generates the light-intensity control signal S2 instructing a light intensity of the light pulse L1 on the basis of the plurality of count values CNT supplied from the counter section 123. Each count value CNT includes not only the number of the pulses PU corresponding to the reflected light pulses L2 but also the number of the pulses PU corresponding to the environmental light and dark current. Therefore, in a case where the count value CNT is small, the floors W2 are low, whereas in a case where the count value CNT is large, the floors W2 are high. On the basis of such a count value CNT, the light intensity setter 29 generates the light-intensity control signal S2 instructing the light intensity of the light pulse L1. The controller 27 supplies the light-intensity control signal S2 to the light source driver 12, and thereby controls the operation of the light source 11 to cause the light source 1 to output the light pulse L1 of the light intensity in accordance with the light-intensity control signal S2.

The light intensity setter 29 sets the light intensity of the light pulse L1 on the basis of, for example, a maximum value of the plurality of count values CNT (a maximum count value CNTmax) for all the pixels PZ.

FIG. 6A illustrates an operation example of the light intensity setter 29. The horizontal axis represents the maximum count value CNTmax, and the vertical axis represents the light intensity of the light pulse L1. In this example, for a case where the maximum count value CNTmax is larger than or equal to a value C1 and smaller than or equal to a value C2, the light intensity increases in a linear manner as the maximum count value CNTmax becomes larger. Further, the light intensity does not change in a case where the maximum count value CNTmax is smaller than the value C1, and similarly, does not change in a case where the maximum count value CNTmax is larger than the value C2.

FIGS. 6B and 6C illustrate other operation examples of the light intensity setter 29. As illustrated in FIG. 6B, the light intensity may be increased stepwise as the maximum count value CNTmax becomes larger. Further, as illustrated in FIG. 6C, the light intensity and the maximum count value CNTmax may have a relationship other than a linear relationship.

As described above, the light intensity setter 29 sets the light intensity of the light pulse L1 to a low intensity in a case where the maximum count value CNTmax is small, and sets the light intensity of the light pulse L1 to a high intensity in a case where the maximum count value CNTmax is large. This makes it possible for the time measurement apparatus 1 to set the light intensity of the light pulse L1 to a low intensity in a case where, for example, the floors W2 are low, and to set the light intensity of the light pulse L1 to a high intensity in a case where the floors W2 are high.

With this configuration, in the time measurement apparatus 1, the light intensity of the light pulse L1 is adjusted on the basis of a plurality of count values CNT supplied from the counter section 123 to cause the peak W1 to exceed the floors W2 in height and also prevent the peak W1 from becoming excessively greater in height than the floors W2. This makes it possible for the time measurement apparatus 1 to effectively reduce power consumption.

FIG. 7 illustrates an implementation example of the sensor unit 20. In this example, the sensor unit 20 is formed in two semiconductor substrates 111 and 112. The semiconductor substrate 111 is provided with a plurality of light receiving elements 31 included in the pixel array 21. The semiconductor substrate 112 is provided with elements other than the plurality of light receiving elements 31 in the pixel array 21, the counter section 123, the time measurement section 124, the histogram generator 125, the processor 26, and the controller 27. The semiconductor substrates 111 are 112 are stacked on each other, and are electrically coupled to each other through, for example, a so-called TCV (Through Chip Via). It is to be noted that while in this example the sensor unit 20 is formed in the two semiconductor substrates 111 and 112, this is non-limiting. Alternatively, for example, the sensor unit 20 and the light source driver 12 may be formed in the two semiconductor substrates 111 and 112. It is possible to form the light source driver 12 in, for example, the semiconductor substrate 112. Further, for example, the sensor unit 20 may be formed in a single semiconductor substrate.

Here, the pixels PZ each correspond to one specific example of the "pixel" in the present disclosure. The pixel signals SIG each correspond to one specific example of the "pulse signal" in the present disclosure. The time measurement section 124 corresponds to one specific example of the "timing detector" in the present disclosure. The counter section 123 corresponds to one specific example of the "pulse number detector" in the present disclosure. The controller 27 corresponds to one specific example of the "controller" in the present disclosure.

Operation and Workings

Next, the operation and workings of the time measurement apparatus 1 of the present embodiment will be described.

Outline of Overall Operation

First, with reference to FIG. 1, an outline of an overall operation of the time measurement apparatus 1 will be described. The light source 11 outputs the light pulse L1 toward a measurement target object. The light source driver 12 controls the operation of the light source 11 on the basis of the light-emission trigger signal S1 supplied from the sensor unit 20 to cause the light source 11 to emit light at timings corresponding to the trigger pulses included in the light-emission trigger signal S1. Further, on the basis of the light-intensity control signal S2 supplied from the sensor unit 20, the light source driver 12 controls the light intensity of the light pulse L1 to be outputted by the light source 11.

The sensor unit 20 generates the depth image PIC by detecting the reflected light pulse L2. Specifically, on the basis of the control signal supplied from the controller 27, the selection signal generator 22 generates a plurality of selection signals SSEL and thereby selects a plurality of pixels PZ on a column-by-column basis sequentially. Each of the selected pixels PZ of the pixel array 21 outputs a pixel signal SIG including pulses PU corresponding to entering reflected light pulses L2. The counter 23 of the counter section 123 counts the number of the pulses PU included in the pixel signal SIG. On the basis of the control signal supplied from the controller 27, the TDC 24 of the time measurement section 124 measures timings of the pulses PU included in the pixel signal SIG, and thereby generates a depth value D. On the basis of the control signal supplied from the controller 27, the histogram generation circuit 25 generates a histogram HY of the depth value D supplied from the TDC 24. The processor 26 generates the depth image PIC on the basis of the control signal supplied from the controller 27 and the information about a plurality of histograms HY supplied from the histogram generator 125. The controller 27 controls the operation of the time measurement apparatus 1 by supplying the control signals to the selection signal generator 22, the counter section 123, the time measurement section 124, the histogram generator 125, and the processor 26, and supplying the light-emission trigger signal S1 and the light-intensity control signal S2 to the light source driver 12.

Detailed Operation

FIG. 8 illustrates an operation example of the time measurement apparatus 1, in which part (A) illustrates a waveform of output light outputted from the light source 11, part (B) illustrates an operation of the pixels PZ(1) in the first column from the left in the pixel array 21, part (C) illustrates an operation of the pixels PZ(2) in the second column from the left in the pixel array 21, part (D) illustrates an operation of the pixels PZ(3) in the third column from the left in the pixel array 21, part (E) illustrates an operation of the pixels PZ(N) in the rightmost column (the Nth column) in the pixel array 21, and part (F) illustrates an operation of the counter section 123. In parts (B) to (E) of FIG. 8, the dot-meshed portions indicate that the pixels PZ are selected, and the portions without dot-meshing indicate that the pixels PZ are unselected. Further, in part (F) of FIG. 8, the dot-meshed portions indicate that the counter section 123 is performing a counting operation, and the portions without dot-meshing indicate that the counter section 123 is not performing the counting operation.

Upon start of a frame period F at timing t1, first, the selection signal generator 22 selects the pixels PZ(1) in the first column during a period from timing t1 to timing t3 (part (B) of FIG. 8). Then, on the basis of the light-emission trigger signal S1, the light source driver 12 controls the operation of the light source 11 to cause the light source 11 to output the light pulse L1 a plurality of times (for example, 1,000 times) in a predetermined light emission cycle (a light emission cycle T) during the period from timing t1 to timing t3 (part (A) of FIG. 8). This causes each pixel PZ(1) to output the pixel signal SIG including pulses PU corresponding to the entering reflected light pulses L2. The TDC 24 of the time measurement section 124 generates a depth value D each time a pulse PU appears on the image signal SIG. The histogram generation circuit 25 of the histogram generator 125 generates a histogram HY of the depth value D supplied from the TDC 24, and supplies information about the histogram HY to the processor 26.

Further, the counter 23 of the counter section 123 counts the number of the pulses PU included in the pixel signal SIG during a period from timing t1 to timing t2. A count period (the period from timing t1 to timing t2) during which the counter 23 performs the counting operation is set to a length greater than the time corresponding to the cycle (the light emission cycle T) in which the light source 11 outputs the light pulse L1. Then, the counter section 123 supplies count results (count values CNT) in the plurality of counters 23 to the light intensity setter 29 of the controller 27.

FIG. 9 illustrates an operation example of the time measurement apparatus 1 when the time measurement apparatus 1 is operated in a dark environment. FIG. 10 illustrates an operation example of the time measurement apparatus 1 when the time measurement apparatus 1 is operated in a bright environment. In each of FIGS. 9 and 10, part (A) illustrates the histogram HY, part (B) illustrates a waveform of output light outputted from the light source 11, and part (C) illustrates a waveform of the pixel signal SIG.

In this example, at timing t11, the light source 11 outputs the light pulse L1, and at timing t12, the pixel PZ detects the reflected light pulse L2 and generates a pulse PU (pulse PU1) corresponding to the reflected light pulse L2. As a result, the histogram HY has a peak W1 at the position of the depth value D corresponding to timing t12.

Further, during this period from timing t11 to timing t13, the pixel PZ generates pulses PU corresponding to the environmental light or the dark current at random timings. In the example of FIG. 9, because the time measurement apparatus 1 is operated in a dark environment, the frequency of occurrence of the pulses PU corresponding to the environmental light or the dark current is low. In the example of FIG. 10, because the time measurement apparatus 1 is operated in a bright environment, the frequency of occurrence of the pulses PU corresponding to the environmental light or the dark current is high. As a result, in the example of FIG. 9, the floors W2 are low, whereas in the example of FIG. 10, the floors W2 are high.

Next, during a period from timing t3 to timing t5, the selection signal generator 22 selects the pixels PZ(2) in the second column (part (C) of FIG. 8). Then, on the basis of the light-emission trigger signal S1, the light source driver 12 controls the operation of the light source 11 to cause the light source 11 to output the light pulse L1 a plurality of times (for example, 1,000 times) in the predetermined light emission cycle (the light emission cycle T) during the period from timing t3 to timing t5 (part (A) of FIG. 8). This causes each pixel PZ(2) to output the pixel signal SIG including pulses PU corresponding to the entering reflected light pulses L2. The TDC 24 generates a depth value D each time a pulse PU appears on the image signal SIG. The histogram generation circuit 25 generates a histogram HY of the depth value D supplied from the TDC 24, and supplies information about the histogram HY to the processor 26.

Further, the counter 23 of the counter section 123 counts the number of the pulses PU included in the pixel signal SIG during a period from timing t3 to timing t4. Then, the counter section 123 supplies the count results (the count values CNT) in the plurality of counters 23 to the light intensity setter 29 of the controller 27.

In this way, during the period from timing t1 to timing t7 (the frame period F), the sensor unit 20 sequentially selects a plurality of pixels PZ on a column-by-column basis, the histogram generator 125 generates histograms HY for all the pixels PZ in the pixel array 21, and the counter section 123 generates count values CNT for all the pixels PZ in the pixel array 21.

Then, the processor 26 generates the depth image PIC on the basis of information about the histograms HY for all the pixels PZ. Further, on the basis of the count values CNT for all the pixels PZ, the light intensity setter 29 of the controller 27 generates the light-intensity control signal S2 and supplies the light-intensity control signal S2 to the light source driver 12. The light intensity of the light pulses L1 to be outputted during a next frame period F starting at timing t7 is thereby set, as illustrated in part (A) of FIG. 8.

(Setting of Light Intensity)

The light intensity setter 29 sets the light intensity of the light pulse L1 on the basis of a plurality of count values CNT, for example. Specifically, as illustrated in FIG. 6A, in the case where the maximum count value CNTmax is small, the light intensity setter 29 sets the light intensity of the light pulse L1 to a low intensity, and in the case where the maximum count value CNTmax is large, the light intensity setter 29 sets the light intensity of the light pulse L1 to a high intensity. This makes it possible for the time measurement apparatus 1 to reduce power consumption. This operation will be described in detail below.

FIG. 11 illustrates a histogram HY when the time measurement apparatus 1 is operated in a dark environment, and FIG. 12 illustrates a histogram HY when the time measurement apparatus 1 is operated in a bright environment.

In the case where the time measurement apparatus 1 is operated in a dark environment, as illustrated in FIG. 9, the frequency of occurrence of the pulses PU corresponding to the environmental light or dark current is low, which causes the count value CNT to be small and causes the floors W2 to be low. On the basis of the count values CNT for all the pixels PZ obtained during a certain frame period F, the light intensity setter 29 acquires a maximum value (a maximum count value CNTmax) of those count values CNT. This maximum count value CNTmax is smaller than a maximum count value CNTmax when the time measurement apparatus 1 is operated in a bright environment. The light intensity setter 29 sets the light intensity of the light pulse L1 for a next frame period F on the basis of this maximum count value CNTmax. In the case where the maximum count value CNTmax is small as described above, the light intensity setter 29 sets the light intensity of the light pulse L1 to a low intensity as illustrated in FIG. 6A. This makes it possible for the time measurement apparatus 1 to prevent the peak W1 from becoming excessively greater in height than the floors W2, as illustrated in FIG. 11.

Further, in the case where the time measurement apparatus 1 is operated in a bright environment, as illustrated in FIG. 10, the frequency of occurrence of the pulses PU corresponding to the environmental light or dark current is high, which causes the count value CNT to be large and causes the floors W2 to be high. On the basis of the count values CNT for all the pixels PZ obtained during a certain frame period F, the light intensity setter 29 acquires the maximum value (the maximum count value CNTmax) of those count values CNT. This maximum count value CNTmax is larger than the maximum count value CNTmax when the time measurement apparatus 1 is operated in a dark environment. The light intensity setter 29 sets the light intensity of the light pulse L1 for a next frame period F on the basis of this maximum count value CNTmax. In the case where the maximum count value CNTmax is large as described above, the light intensity setter 29 sets the light intensity of the light pulse L1 to a high intensity as illustrated in FIG. 6A. This makes it possible for the time measurement apparatus 1 to cause the peak W1 to exceed the floors W2 in height, as illustrated in FIG. 12.

As described above, in the time measurement apparatus 1, the light intensity of the light pulse L1 is adjusted on the basis of the count values CNTs supplied from the counter section 123. Specifically, as illustrated in FIG. 6A, for example, the light intensity setter 29 sets the light intensity of the light pulse L1 to a low intensity in the case where the maximum count value CNTmax is small, and sets the light intensity of the light pulse L1 to a high intensity in the case where the maximum count value CNTmax is large. This makes it possible for the time measurement apparatus 1 to adjust the light intensity of the light pulse L1 to cause the peak W1 to exceed the floors W2 in height and also prevent the peak W1 from becoming excessively greater in height than the floors W2. As a result, it is possible for the time measurement apparatus 1 to effectively reduce power consumption.

That is, for example, in the case where the time measurement apparatus 1 is operated in a dark environment, providing the light pulse L1 with the same light intensity as in the case of operating the time measurement apparatus 1 in a bright environment can result in the peak W1 being excessively greater in height than the floors W2, as illustrated in FIG. 13. In this case, the light source 11 will consume a lot of electric power. In contrast, in the present embodiment, the light intensity of the light pulse L1 is adjusted on the basis of the plurality of count values CNT supplied from the counter section 123, and therefore it is possible to prevent the peak W1 from becoming excessively greater in height than the floors W2, as illustrated in FIG. 11. Thus, in the time measurement apparatus 1, it is possible to set the light intensity of the light pulse L1 to the minimum necessary light intensity depending on the floors W2. This makes it possible to limit electric power to be consumed by the light source 11, and consequently makes it possible to effectively reduce power consumption.

Further, in the time measurement apparatus 1, the light intensity setter 29 adjusts the light intensity of the light pulse L1 on the basis of the maximum value (the maximum count value CNTmax) of the count values CNT for all the pixels PZ. The pixel PZ associated with the maximum count value CNTmax is in many cases a pixel PZ that provides, for example, the highest floors W2 among all of the pixels PZ. Thus, adjusting the light intensity of the light pulse L1 to this maximum count value CNTmax makes it possible to reduce a possibility that the peak W1 can become indistinguishable from the floors W2 in histograms for some of the pixels PZ.

Effects

According to the present embodiment, as described above, it is possible to reduce power consumption effectively because the light intensity of the light pulse is adjusted on the basis of the count values supplied from the counter section.

According to the present embodiment, the light intensity of the light pulse is adjusted on the basis of the maximum count value. This makes it possible to reduce a possibility that the peak can become indistinguishable from the floors in the histograms HY.

Modification Example 1-1

In the foregoing embodiment, the sensor unit 20 controls the operation of the light source 11 by supplying the light-emission trigger signal S1 to the light source driver 12; however, this is non-limiting. Alternatively, for example, as in a time measurement apparatus 1A illustrated in FIG. 14, the light source driver may supply the sensor unit with a trigger signal instructing operation timing. The time measurement apparatus 1A includes a light source driver 12A and a sensor unit 20A. The light source driver 12A generates a trigger signal S3 instructing operation timing of the sensor unit 20A and supplies the trigger signal S3 to the sensor unit 20A. The sensor unit 20A operates on the basis of the trigger signal S3.

Modification Example 1-2

In the foregoing embodiment, the light intensity of the light pulse L1 is adjusted on the basis of the maximum value (the maximum count value CNTmax) of the count values CNT for all the pixels PZ; however, this is non-limiting. For example, in a case where the count values CNT for all the pixels PZ are almost equal to each other, the light intensity setter 29 may adjust the light intensity of the light pulse L1 on the basis of an average value of the count values CNT for all the pixels PZ. In this case, for example, even if any one of the pixels PZ is in failure, it is possible to suppress an influence of the pixel PZ in failure on the light intensity.

Modification Example 1-3

In the foregoing embodiment, a plurality of counters 23 as many as the plurality of signal lines SGL are provided to obtain the count values CNT for all the pixels PZ; however, this is non-limiting. Alternatively, for example, a smaller number of counters 23 may be provided to obtain count values CNT for only some of the pixels PZ. The number of the counters 23 may be more than one, or may be one as in a sensor unit 20C illustrated in FIG. 15, for example. The sensor unit 20C includes the counter 23 and a controller 27C. The counter 23 is coupled to one of the plurality of signal lines SGL (the uppermost signal line SGL in this example) of the pixel array 21 and, on the basis of a control signal supplied from the controller 27C, counts the number of the pulses PU included in the pixel signal SIG supplied from the pixel array 21 via this signal line SGL. The counter 23 thereby obtains count values CNT for a plurality of pixels PZ coupled to the signal line SGL. The counter 23 then supplies these count values CNT to the controller 27C. The controller 27C includes a light intensity setter 29C. The light intensity setter 29C generates the light-intensity control signal S2 instructing the light intensity of the light pulse L1 on the basis of the plurality of count values CNT supplied from the counter 23.

Modification Example 1-4

In the foregoing embodiment, the sensor unit 20 supplies the light-intensity control signal S2 to the light source driver 12; however, this is non-limiting. The present modification example will be described below with reference to some examples.

FIG. 16 illustrates a configuration example of a time measurement apparatus 1D according to the present modification example. The time measurement apparatus 1D includes a light source driver 12D and a sensor unit 20D. The light source driver 12D includes a light intensity setter 17D. Like the light intensity setter 29 according to the foregoing embodiment, the light intensity setter 17D sets the light intensity of the light pulse L1 to be outputted by the light source 11 on the basis of the count values CNT supplied from the sensor unit 20D.

FIG. 17 illustrates a configuration example of the sensor unit 20D. The sensor unit 20D includes a counter 23 and a controller 27D. The counter 23 is coupled to one of the plurality of signal lines SGL (the uppermost signal line SGL in this example) of the pixel array 21 and, on the basis of a control signal supplied from the controller 27C, counts the number of the pulses PU included in the pixel signal SIG supplied from the pixel array 21 via this signal line SGL. The counter 23 thereby obtains count values CNT for a plurality of pixels PZ coupled to the signal line SGL. The counter 23 then supplies these count values CNT to the light intensity setter 17D of the light source driver 12D. The controller 27D corresponds to the controller 27 according to the foregoing embodiment without the light intensity setter 29.

FIG. 18 illustrates a configuration example of a time measurement apparatus 1E according to the present modification example. The time measurement apparatus 1E includes a light source driver 12E and a sensor unit 20E. The light source driver 12E includes a counter 16E and the light intensity setter 17D. Like the counter 23 according to the foregoing embodiment, the counter 16E counts the number of the pulses PU included in the pixel signal SIG. The counter 16E then supplies the count result (the count value CNT) to the light intensity setter 17D. On the basis of the count value CNT supplied from the counter 16E, the light intensity setter 17D sets the light intensity of the light pulse L1 to be outputted by the light source 11.

FIG. 19 illustrates a configuration example of the sensor unit 20E. The sensor unit 20E includes a controller 27E. The sensor unit 20E supplies one of the plurality of pixel signals SIG generated by the pixel array 21 to the counter 16E of the light source driver 12E. The controller 27E corresponds to the controller 27 according to the foregoing embodiment without the light intensity setter 29 and without the function of controlling the operation of the counters 23.

Modification Example 1-5

In the foregoing embodiment, the pixel signals SIG generated by the pixels PZ intended to obtain the depth values D are supplied to the counters 23; however, this is non-limiting. Alternatively, for example, as in a sensor unit 20F illustrated in FIG. 20, pixel signals SIG generated by pixels other than the pixels PZ intended to obtain the depth values D may be supplied to a counter 23. The sensor unit 20F includes a pixel array 21F and the counter 23. The pixel array 21F includes a plurality of dummy pixels PDM. The dummy pixels PDM have a circuit configuration the same as the circuit configuration of the pixels PZ (FIG. 3). The plurality of dummy pixels PDM is coupled to a single signal line SGL. Here, the pixels PZ each correspond to one specific example of the "first pixel" in the present disclosure. The dummy pixels PDM each correspond to one specific example of the "second pixel" in the present disclosure. The counter 23 is coupled to the signal line SGL to which the plurality of dummy pixels PDM is coupled. The counter 23 counts the number of the pulses PU included in the pixel signals SIG supplied from the dummy pixels PDM.

Modification Example 1-6

In the foregoing embodiment, a plurality of counters 23 are provided and the light intensity of the light pulse L1 is set on the basis of the count values CNT in these counters 23; however, this is non-limiting. Alternatively, for example, as in a sensor unit 20G illustrated in FIG. 21, the light intensity of the light pulse L1 may be set on the basis of the histograms HY generated by the histogram generation circuits 25. The sensor unit 20G includes a histogram generator 125G and a controller 27G. The histogram generator 125G has a function of supplying information about the floors W2 in the histograms HY generated by a plurality of histogram generation circuits 25 to the controller 27G. The controller 27G includes a light intensity setter 29G. The light intensity setter 29G sets the light intensity of the light pulse L1 on the basis of the information about the floors W2 supplied from the histogram generator 125G. Specifically, the light intensity setter 29G sets the light intensity of the light pulse L1 on the basis of the highest floor W2 of the floors W2 included in the plurality of histograms HY. For example, the light intensity setter 29G sets the light intensity of the light pulse L1 to a low intensity in a case where the floor W2 is low, and sets the light intensity of the light pulse L1 to a high intensity in a case where the floor W2 is high. The light intensity setter 29G then generates the light-intensity control signal S2 instructing the light intensity of the light pulse L1 on the basis of the set light intensity of the light pulse L1. Here, the histogram generator 125G corresponds to one specific example of the "pulse number detector" according to the present disclosure.

Modification Example 1-7

In the foregoing embodiment, the pixels PZ in the pixel array 21 are selected on a column-by-column basis; however, this is non-limiting. Alternatively, for example, as in a sensor unit 20H illustrated in FIG. 22, the pixels PZ may be selected on a multiple-column basis (a two-column basis in this example). The sensor unit 20H includes a pixel array 21H. The pixel array 21H includes a plurality of selection lines SEL, a plurality of signal lines SGL, and a plurality of pixels PZ. For example, a plurality of pixels PZ in the first column from the left and a plurality of pixels PZ in the second column are coupled to the first selection line SEL from the left. Further, a plurality of pixels PZ in the third column and a plurality of pixels PZ in the fourth column are coupled to the second selection line SEL. The same applies to the fifth and subsequent columns. Further, for example, of a plurality of pixels PZ in the first row, pixels PZ included in the odd-numbered columns and pixels PZ included in the even-numbered columns are coupled to mutually different signal lines SGL. The same applies to the second and subsequent rows. With this configuration, the pixels PZ are selected on a two-column basis in the sensor unit 20H.

Modification Example 1-8

In the foregoing embodiment, the counter section 123 and the time measurement section 124 operate during the same period; however, this is non-limiting. Alternatively, for example, the time measurement apparatus 1 may generate the depth image PIC by causing the counter section 123 to operate to set the light intensity of the light pulse L1 in advance and thereafter causing the light source 11 to generate the light pulse L1 on the basis of the set light intensity.

Other Modification Examples

Further, two or more of these modification examples may be combined.

2. Second Embodiment

Next, a time measurement apparatus 2 according to a second embodiment will be described. The present embodiment is to adjust the number of the light pulses L1 on the basis of a plurality of count values CNT. It is to be noted that the components substantially the same as those of the time measurement apparatus 1 according to the foregoing first embodiment are denoted by the same reference numerals, and descriptions thereof are omitted as appropriate.

FIG. 23 illustrates a configuration example of the time measurement apparatus 2. The time measurement apparatus 2 includes a light source driver 42 and a sensor unit 40.

The light source driver 42 drives the light source 11 on the basis of an instruction from the sensor unit 40. Specifically, the light source driver 42 controls an operation of the light source 11 on the basis of the light-emission trigger signal S1 supplied from the sensor unit 40 to cause the light source 11 to emit light at timings corresponding to the trigger pulses included in the light-emission trigger signal S1. In this example, the number of the trigger pulses changes. As a result, in the time measurement apparatus 2, the number of the light pulses L1 is changed.

The sensor unit 40 detects the reflected light pulses L2 and thereby generates the depth image PIC including information about the distance to the measurement target object. Further, the sensor unit 40 also has a function of generating the light-emission trigger signal S1 and supplying the light-emission trigger signal S1 to the light source driver 42.

FIG. 24 illustrates a configuration example of the sensor unit 40. The sensor unit 40 includes a controller 47. The controller 47 controls the operation of the time measurement apparatus 2 by supplying control signals to the selection signal generator 22, the counter section 123, the time measurement section 124, the histogram generator 125, and the processor 26, and supplying the light-emission trigger signal S1 to the light source driver 42. The controller 47 includes a light pulse number setter 49 and a light-emission timing setter 48.

The light pulse number setter 49 sets the number of the light pulses L1 to be outputted by the light source 11 on the basis of a plurality of count values CNT supplied from the counter section 123. Specifically, on the basis of the maximum value (the maximum count value CNTmax) of the plurality of count values CNT for all the pixels PZ obtained during a certain frame period F, the light pulse number setter 49 sets the number of the light pulses L1 for a next frame period F. For example, the light pulse number setter 49 sets the number of the light pulses L1 to a small number in the case where the maximum count value CNTmax is small, and sets the number of the light pulses L1 to a large number in the case where the maximum count value CNTmax is large.

The light-emission timing setter 48 generates the light-emission trigger signal S1 instructing light emission timing in the light source 11 on the basis of the number of the light pulses L1 set by the light pulse number setter 49.

FIG. 25 illustrates an example of the light pulses L1 generated by the light source 11 of the time measurement apparatus 2. In this example, the light source 11 outputs the light pulses L1 in a predetermined light emission cycle during a first frame period F (timing t21 to timing t22). Then, in this example, because the maximum count value CNTmax obtained during the frame period F is small, the light pulse number setter 49 sets the number of the light pulses L1 to a small number. On the basis of the number of the light pulses L1 set by the light pulse number setter 49, the light-emission timing setter 48 sets the light emission timing in the light source 11 to increase the interval between the light pulses L1. By this operation, as illustrated in FIG. 25, the light source 11 outputs a smaller number of light pulses L1 during the next frame period F (timing t22 to timing t23) than the period from timing t21 to timing t22.

As described above, in the time measurement apparatus 2, the light pulse number setter 49 adjusts the number of the light pulses L1 on the basis of the count values CNT supplied from the counter section 123. Specifically, the light pulse number setter 49 sets the number of the light pulses L1 to a small number in the case where the maximum count value CNTmax is small, and sets the number of the light pulses L1 to a large number in the case where the maximum count value CNTmax is large. This makes it possible for the time measurement apparatus 2 to adjust the number of the light pulses L1 to cause the peak W1 to exceed the floors W2 in height and also prevent the peak W1 from becoming excessively greater in height than the floors W2, as with the time measurement apparatus 1. Consequently, it is possible for the time measurement apparatus 2 to effectively reduce power consumption in the light source 11.

Further, in the case where the number of the light pulses L1 is reduced, the operating time becomes shorter for the counter section 123 and the time measurement section 124, and the calculation amount decreases for the histogram generator 155 and the processor 26. It is thereby possible to effectively reduce power consumption in the counter section 123, the time measurement section 124, the histogram generator 125, and the processor 26.

According to the present embodiment, as described above, it is possible to effectively reduce power consumption because the number of the light pulses is adjusted on the basis of the count values supplied from the counter section.

Modification Example 2

Each of the modification examples of the foregoing first embodiment may be applied to the time measurement apparatus 2 according to the present embodiment described above.

3. Third Embodiment

Next, a time measurement apparatus 3 according to a third embodiment will be described. The present embodiment stops the operation of the light source 11 when the height of the peak W1 in the histogram HY reaches a threshold TH that depends on the floors W2. It is to be noted that the components substantially the same as those of the time measurement apparatus 1 according to the foregoing first embodiment are denoted by the same reference numerals, and descriptions thereof are omitted as appropriate.

As illustrated in FIG. 23, the time measurement apparatus 3 includes a sensor unit 50. The sensor unit 50 detects the reflected light pulses L2 and thereby generates the depth image PIC including information about the distance to the measurement target object. Further, the sensor unit 50 also has a function of generating the light-emission trigger signal S1 and supplying the light-emission trigger signal S1 to the light source driver 42.

FIG. 26 illustrates a configuration example of the sensor unit 50. The sensor unit 50 includes a histogram generator 155 and a controller 57.

The histogram generator 155 includes a plurality of histogram generation circuits 25 (histogram generation circuits 25(1), 25(2), 25(3), . . . ). On the Basis of the threshold TH supplied from the controller 57, the histogram generator 155 checks whether the heights of the peaks W1 in the histograms HY generated by the plurality of histogram generation circuits 25 have reached this threshold TH. The histogram generator 155 then generates a stop signal STP when the heights of the peaks W1 in all the histograms HY for one column of pixels PZ have reached the threshold TH. The histogram generator 155 supplies the stop signal STP to the controller 57.

The controller 57 controls the operation of the time measurement apparatus 3 by supplying control signals to the selection signal generator 22, the counter section 123, the time measurement section 124, the histogram generator 155, and the processor 26, and supplying the light-emission trigger signal S1 to the light source driver 42. The controller 57 includes a threshold setter 59 and a light-emission timing setter 58.

The threshold setter 59 generates the threshold TH on the basis of a plurality of count values CNT supplied from the counter section 123. Specifically, on the basis of the maximum value (the maximum count value CNTmax) of the plurality of count values CNT for all the pixels PZ obtained during a certain frame period F, the threshold setter 59 sets the threshold TH to be used during a next frame period F. For example, the threshold setter 59 sets the threshold TH to a low value in the case where the maximum count value CNTmax is small, and sets the threshold TH to a high value in the case where the maximum count value CNTmax is large.

The light-emission timing setter 58 generates the light-emission trigger signal S1 instructing light emission timing in the light source 11. The light-emission timing setter 58 then stops the generation of the light-emission trigger signal S1 on the basis of the stop signal STP supplied from the histogram generator 155.

FIG. 27 illustrates a histogram HY when the time measurement apparatus 3 is operated in a dark environment, and FIG. 28 illustrates a histogram HY when the time measurement apparatus 3 is operated in a bright environment.

In the case where the time measurement apparatus 3 is operated in a dark environment, the count values CNT are small and accordingly the threshold setter 59 sets the threshold TH to a low value as illustrated in FIG. 27. Then, in the next frame period F, the histogram generator 155 generates the stop signal STP when, as illustrated in FIG. 27, the heights of the peaks W1 in all the histograms HY for the pixels in the first column have reached the threshold TH. The light source 11 thus stops generating the light pulse L1. The same applies to the second and subsequent columns. This makes it possible for the time measurement apparatus 3 to prevent the peaks W1 from becoming excessively greater in height than the floors W2, as illustrated in FIG. 27.

Further, in the case where the time measurement apparatus 3 is operated in a bright environment, the count values CNT are large and accordingly the threshold setter 59 sets the threshold TH to a high value as illustrated in FIG. 28. Then, in the next frame period F, the histogram generator 155 generates the stop signal STP when, as illustrated in FIG. 28, the heights of the peaks W1 in all the histograms HY for the pixels in the first column have reached the threshold TH. The light source 11 thus stops generating the light pulse L1. The same applies to the second and subsequent columns. This makes it possible for the time measurement apparatus 3 to cause the peaks W1 to exceed the floors W2 in height.

As described above, in the time measurement apparatus 3, the threshold TH is set on the basis of the count values CNT supplied from the counter section 123. Specifically, the threshold setter 59 sets the threshold TH to a low value in the case where the maximum count value CNTmax is small, and sets the threshold TH to a high value in the case where the maximum count value CNTmax is large. Then, in the time measurement apparatus 3, the generation of the light pulse L1 is stopped when the heights of the peaks W1 in the histograms HY have reached the threshold TH. It is thereby possible for the time measurement apparatus 3 to adjust the number of the light pulses L1 to cause the peaks W1 to exceed the floors W2 in height and also prevent the peaks W1 from becoming excessively greater in height than the floors W2, as with the time measurement apparatus 1. Consequently, it is possible for the time measurement apparatus 3 to effectively reduce power consumption in the light source 11.

Further, in the case where the number of the light pulses L1 is reduced, the operating time becomes shorter for the counter section 123 and the time measurement section 124, and the calculation amount decreases for the histogram generator 155 and the processor 26. It is thereby possible to effectively reduce power consumption in the counter section 123, the time measurement section 124, the histogram generator 155, and the processor 26.

In the present embodiment, as described above, a threshold is set on the basis of the count values supplied from the counter section, and the generation of the light pulse is stopped when the heights of the peaks in the histograms have reached the threshold. This makes it possible to reduce power consumption effectively.

4. Application Example

Next, an application example of the time measurement apparatuses according to the foregoing embodiments will be described.

FIG. 29 illustrates a configuration example of an imaging apparatus 9. The imaging apparatus 9 corresponds to an imaging apparatus to which the technology according to the time measurement apparatus 1 of the first embodiment is applied. It should be noted that this is non-limiting, and the technology according to the time measurement apparatus 2 of the second embodiment or the technology according to the time measurement apparatus 3 of the third embodiment may be applied to an imaging apparatus. The imaging apparatus 9 includes an imaging unit 60.

The imaging unit 60 performs an imaging operation and thereby generates a captured image PIC2. Further, the imaging unit 60 also has a function of detecting the reflected light pulse L2 when the light source 11 is operated and thereby generating a depth image PIC. The imaging unit 60 then outputs the generated captured image PIC2 and depth image PIC. Further, the imaging unit 60 has a function of generating the light-emission trigger signal S1 and the light-intensity control signal S2 when generating the depth image PIC, and supplying the light-emission trigger signal S1 and the light-intensity control signal S2 to the light source driver 12.

FIG. 30 illustrates a configuration example of the imaging unit 60. The imaging unit 60 includes a pixel array 61, a counter section 163, and a processor 66.

The pixel array 61 includes a plurality of pixels P. The plurality of pixels P includes a plurality of red pixels PR, a plurality of green pixels PG, a plurality of blue pixels PB, and a plurality of pixels PZ. The red pixels PR detect red light, the green pixels PG detect green light, and the blue pixels PB detect blue light. The red pixels PR, the green pixels PG, and the blue pixels PB each have a circuit configuration the same as the circuit configuration of the pixels PZ (FIG. 3). Red color filters are formed in the red pixels PR, green color filters are formed in the green pixels PG, and blue color filters are formed in the blue pixels PB.

FIG. 31 illustrates a layout example of the red pixels PR, the green pixels PG, the blue pixels PB, and the pixels PZ in the pixel array 61. In the pixel array 61, four pixels (unit U) arranged in two rows and two columns are repeatedly arranged. In the unit U, the green pixel PG is located in the upper left, the blue pixel PB is located in the lower left, the red pixel PR is located in the upper right, and the pixel PZ is located in the lower right.

Further, as illustrated in FIG. 30, the pixel array 61 includes a plurality of selection lines SEL, a plurality of signal lines SGL, and a plurality of signal lines SGL2. Each of the plurality of signal lines SGL extends in a horizontal direction in FIG. 30, and has one end coupled to the time measurement section 124, as illustrated in FIG. 30. Each of the plurality of signal lines SGL2 extends in the horizontal direction in FIG. 30, and has one end coupled to the counter section 163, as illustrated in FIG. 30.

In the unit U, the green pixel PG and the blue pixel PB are coupled to the same one of the selection lines SEL, while the red pixel PR and the pixel PZ are coupled to one of the selection lines SEL that is different from the selection line SEL to which the green pixel PG and the blue pixel PB are coupled. Further, in the unit U, the green pixel PG and the red pixel PR are coupled to the same one of the signal lines SGL2, while the blue pixel PB is coupled to one of the signal lines SGL2 that is different from the signal line SGL2 to which the green pixel PG and the red pixel PR are coupled. Further, the pixel PZ is coupled to the signal line SGL.

The counter section 163 includes a plurality of counters 63 (counters 63(1), 63(2), 63(3), 63(4), . . . ). The plurality of counters 63 are respectively coupled to the plurality of signal lines SGL2 in the pixel array 21. On the basis of the control signal supplied from the controller 27, each of the plurality of counters 63 counts the number of the pulses PU included in the pixel signal SIG supplied from the pixel array 61 via the signal line SGL2. The counter section 163 then supplies the count results in the plurality of counters 63 to the processor 66. Further, the counter section 163 also has a function of supplying the count results (the count values CNT) in the plurality of counters 63 to the light intensity setter 29 of the controller 27.

The processor 66 generates the captured image PIC2 on the basis of the count results supplied from the counter section 163. The processor 66 then outputs the generated captured image PIC2.

Here, the pixel PZ corresponds to one specific example of the "first pixel" in the present disclosure. The red pixel PR, the green pixel PG, and the blue pixel PB correspond to one specific example of the "second pixel" in the present disclosure.

In the imaging apparatus 9, the plurality of red pixels PR, the plurality of green pixels PG, and the plurality of blue pixels PB in the pixel array 61 output the pixel signals SIG, and the plurality of counters 63 of the counter section 163 counts the number of the pulses PU included in the pixel signals SIG. Then, the processor 66 generates the captured image PIC2 on the basis of the count results in the plurality of counters 63.

Further, in a case where the imaging apparatus 9 generates the depth image PIC, the counter section 163 supplies the count results (the count values CNT) in the plurality of counters 63 to the light intensity setter 29 of the controller 27. The light intensity setter 29 sets the light intensity of the light pulses L1 on the basis of the plurality of count values CNT supplied from the counter section 163. The light source 11 generates the light pulses L1 on the basis of the set light intensity. The pixels PZ in the pixel array 61 output image signals SIG each including the pulses PU corresponding to the reflected light pulses L2. The TDCs 24 of the time measurement section 124 generate depth values D by measuring timings of the pulses PU included in the image signals SIGs on the basis of the control signal supplied from the controller 27. The histogram generation circuits 25 of the histogram generator 125 generate the histograms HY of the depth values D supplied from the TDCs 24 on the basis of the control signal supplied from the controller 27. The processor 26 generates the depth image PIC on the basis of the control signal supplied from the controller 27 and information about the plurality of histograms HY supplied from the histogram generator 125.

As described above, it is possible for the imaging apparatus 9 to acquire the count values CNT with the counter section 163 used in the imaging operation and to set the light intensity of the light pulses L1 on the basis of the count values CNT. This makes it possible to achieve a reduction in circuit scale because it is not necessary to provide the counter section 123 illustrated in FIG. 2 aside from the counter section 163.

Although the present technology has been described above with reference to some embodiments and modification examples, and one specific application example thereof, the present technology is not limited thereto, and various modifications may be made.

For example, in the foregoing embodiments, a plurality of pixels PZ is used to configure the time measurement apparatus; however, the present technology is not limited thereto, and instead, for example, the time measurement apparatus may be configured using a single pixel PZ. Even in this case, by outputting light and detecting reflected light reflected by a measurement target object, it is possible to measure a time difference between the timing of output of the light and the timing of detection of the reflected light.

It should be appreciated that the effects described herein are mere examples and non-limiting. In addition, other effects may be achieved.

It is to be noted that the present technology may be configured as follows.

(1)

A time measurement apparatus including:
- a pixel that includes a light receiving element and is configured to generate a pulse signal including a logic pulse on the basis of a light reception result in the light receiving element;
- a timing detector configured to detect a light reception timing in the light receiving element on the basis of the pulse signal;
- a pulse number detector configured to detect a pulse number of the logic pulse included in the pulse signal; and
- a controller configured to control, on the basis of the pulse number, an operation of a light source outputting a plurality of light pulses.

(2)

The time measurement apparatus according to (1), in which the controller is configured to control a light intensity of each of the plurality of light pulses on the basis of the pulse number.

(3)

The time measurement apparatus according to (2), in which the controller is configured to set the light intensity to a first light intensity in a case where the pulse number is a first pulse number, and to set the light intensity to a second light intensity higher than the first light intensity in a case where the pulse number is a second pulse frequency larger than the first pulse number.

(4)

The time measurement apparatus according to (1), in which the controller is configured to control a light pulse number of the plurality of light pulses on the basis of the pulse number.

(5)

The time measurement apparatus according to (4), in which the controller is configured to set the light pulse number to a first light pulse number in a case where the pulse number is a first pulse number, and to set the light pulse number to a second light pulse number larger than the first light pulse number in a case where the pulse number is a second pulse number larger than the first pulse number.

(6)

The time measurement apparatus according (1), further including a histogram generator configured to generate a histogram for the light reception timing on the basis of the light reception timing.

(7)

The time measurement apparatus according to (6), in which the controller is configured to stop the operation of the light source when a peak value of the histogram reaches a threshold that depends on the pulse number.

(8)

The time measurement apparatus according to (7), in which the controller is configured to set the threshold to a first threshold in a case where the pulse number is a first pulse number, and to set the threshold to a second threshold higher than the first threshold in a case where the pulse number is a second pulse number larger than the first pulse number.

(9)

The time measurement apparatus according to any one of (1) to (8), in which the pulse number detector is configured to detect the pulse number on the basis of the pulse signal.

(10)

The time measurement apparatus according to any one of (1) to (8), in which the pulse number detector is configured to detect the pulse number by generating a histogram for the light reception timing on the basis of the light reception timing.

(11)

The time measurement apparatus according to any one of (1) to (10), in which the timing detector is configured to detect the light reception timing with respect to a light emission timing of each of the light pulses.

(12)

The time measurement apparatus according to any one of (1) to (11), further including the light source.

(13)

A time measurement apparatus including:
a first pixel that includes a first light receiving element and is configured to generate a first pulse signal including a logic pulse on the basis of a light reception result in the first light receiving element;
a second pixel that includes a second light receiving element and is configured to generate a second pulse signal including a logic pulse on the basis of a light reception result in the second light receiving element;
a timing detector configured to detect a light reception timing in the first light receiving element on the basis of the first pulse signal;
a pulse number detector configured to detect a pulse number of the logic pulse included in the second pulse signal; and
a controller configured to control, on the basis of the pulse number, an operation of a light source outputting a plurality of light pulses.

(14)

The time measurement apparatus according to (12), in which the second light receiving element is configured to receive light of a predetermined color.

This application claims priority from Japanese Patent Application No. 2018-099515 filed with the Japan Patent Office on May 24, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A time measurement apparatus, comprising:
a pixel that includes a light receiving element, wherein the light receiving element is configured to:
receive a reflected light pulse reflected by a measurement target; and
output a light reception result based on the reception of the reflected light pulse,
the pixel is configured to generate a pulse signal based on the light reception result of the light receiving element, and
the pulse signal includes a logic pulse that corresponds to the reflected light pulse;
a timing detector configured to detect, based on the pulse signal, a light reception timing of the reception of the reflected light pulse;
a histogram generator configured to generate, based on the light reception timing, a histogram for the light reception timing;
a pulse number detector configured to detect a pulse number of the logic pulse included in the pulse signal; and
a controller configured to:
control, based on the histogram, an operation of a light source which outputs a plurality of light pulses, wherein the plurality of light pulses is incident on the measurement target;
stop the operation of the light source in a case where a peak value of the histogram reaches a threshold, wherein the threshold is based on the pulse number; and
control a light intensity of each of the plurality of light pulses based on the pulse number.

2. The time measurement apparatus according to claim 1, wherein
the controller is further configured to:
set the light intensity to a first light intensity based on the pulse number being equal to a first pulse number; and
set the light intensity to a second light intensity which is higher than the first light intensity based on the pulse number being equal to a second pulse number, and
the second pulse number is larger than the first pulse number.

3. The time measurement apparatus according to claim 1, wherein the controller is further configured to control a number of light pulses of the plurality of light pulses based on the pulse number.

4. The time measurement apparatus according to claim 3, wherein the controller is further configured to:
set the number of light pulses to a first light pulse number based on the pulse number being equal to a first pulse number; and
set the number of light pulses to a second light pulse number which is larger than the first light pulse number based on the pulse number being equal to a second pulse number, and
the second pulse number is larger than the first pulse number.

5. The time measurement apparatus according to claim 1, wherein
the controller is further configured to:
set the threshold to a first threshold based on the pulse number being equal to a first pulse number; and
set the threshold to a second threshold which is higher than the first threshold based on the pulse number being equal to a second pulse number, and
the second pulse number is larger than the first pulse number.

6. The time measurement apparatus according to claim 1, wherein the pulse number detector is further configured to detect the pulse number based on the pulse signal.

7. The time measurement apparatus according to claim 1, wherein the pulse number detector is further configured to detect the pulse number based on the histogram.

8. The time measurement apparatus according to claim 1, wherein the timing detector is further configured to detect the light reception timing with respect to a light emission timing of each of the plurality of light pulses outputted by the light source.

9. The time measurement apparatus according to claim 1, further comprising the light source.

10. A time measurement apparatus, comprising:
a first pixel that includes a first light receiving element, wherein
the first light receiving element is configured to:
receive a first reflected light pulse reflected by a measurement target; and
output a first light reception result based on the reception of the first reflected light pulse,
the first pixel is configured to generate a first pulse signal based on the first light reception result of the first light receiving element, and
the first pulse signal includes a first logic pulse that corresponds to the first reflected light pulse;
a second pixel that includes a second light receiving element, wherein
the second light receiving element is configured to:
receive a second reflected light pulse reflected by the measurement target; and
output a second light reception result based on the reception of the second reflected light pulse,
the second pixel is configured to generate a second pulse signal based on the second light reception result of the second light receiving element, and
the second pulse signal includes a second logic pulse that corresponds to the second reflected light pulse;
a timing detector configured to detect, based on the first pulse signal, a light reception timing of the reception of the first reflected light pulse;
a histogram generator configured to generate, based on the light reception timing, a histogram for the light reception timing;
a pulse number detector configured to detect a pulse number of the second logic pulse included in the second pulse signal; and
a controller configured to:
control, based on the histogram, an operation of a light source which outputs a plurality of light pulses, wherein the plurality of light pulses is incident on the measurement target;
stop the operation of the light source in a case where a peak value of the histogram reaches a threshold, wherein the threshold is based on the pulse number; and
control a light intensity of each of the plurality of light pulses based on the pulse number.

11. The time measurement apparatus according to claim 10, wherein the second light receiving element is further configured to receive light of a specific color.

12. A time measurement apparatus, comprising:
a pixel that includes a light receiving element, wherein
the light receiving element is configured to:
receive a reflected light pulse reflected by a measurement target; and
output a light reception result based on the reception of the reflected light pulse,
the pixel is configured to generate a pulse signal based on the light reception result of the light receiving element,
the pulse signal includes a logic pulse that corresponds to the reflected light pulse;
a timing detector configured to detect, based on the pulse signal, a light reception timing of the reception of the reflected light pulse;
a pulse number detector configured to detect a pulse number of the logic pulse included in the pulse signal;
a histogram generator configured to generate a histogram for the light reception timing based on the light reception timing; and
a controller configured to:
control, based on the pulse number, an operation of a light source which outputs a plurality of light pulses; and
stop the operation of the light source in a case where a peak value of the histogram reaches a threshold, wherein the threshold is based on the pulse number.

* * * * *